United States Patent
Redden et al.

(10) Patent No.: US 12,359,404 B2
(45) Date of Patent: Jul. 15, 2025

(54) DETECTING UNTRAVERSABLE ENVIRONMENT AND PREVENTING DAMAGE BY A VEHICLE

(71) Applicant: Deere & Company, Moline, IL (US)

(72) Inventors: Lee Kamp Redden, Palo Alto, CA (US); Divya Sharma, San Jose, CA (US); Kent Michael Anderson, Signal Mountain, TN (US); Bryon William Majusiak, Incline Village, NV (US); Benjamin Ray Chostner, San Francisco, CA (US); James Patrick Ostrowski, Mountain View, CA (US)

(73) Assignee: Deere & Company, Moline, IL (US)

( * ) Notice: Subject to any disclaimer, the term of this patent is extended or adjusted under 35 U.S.C. 154(b) by 327 days.

(21) Appl. No.: 17/881,436

(22) Filed: Aug. 4, 2022

(65) Prior Publication Data
US 2023/0038422 A1 Feb. 9, 2023

Related U.S. Application Data

(60) Provisional application No. 63/230,430, filed on Aug. 6, 2021.

(51) Int. Cl.
*E02F 9/26* (2006.01)
*E02F 9/20* (2006.01)
(Continued)

(52) U.S. Cl.
CPC .............. *E02F 9/261* (2013.01); *E02F 9/205* (2013.01); *G05D 1/0214* (2013.01);
(Continued)

(58) Field of Classification Search
CPC . E02F 9/261; E02F 9/205; E02F 9/262; E02F 9/267; G05D 1/0214; G05D 1/0246;
(Continued)

(56) References Cited

U.S. PATENT DOCUMENTS

| 5,751,576 A | 5/1998 | Monson |
| 5,884,224 A * | 3/1999 | McNabb .................. A01G 7/00 700/284 |

(Continued)

OTHER PUBLICATIONS

PCT International Search Report and Written Opinion, PCT Application No. PCT/US22/39462, Feb. 7, 2023, 14 pages.
(Continued)

*Primary Examiner* — Mussa A Shaawat
(74) *Attorney, Agent, or Firm* — Fenwick & West LLP

(57) ABSTRACT

A vehicle moves through an environment (e.g., a farming, construction, mining, or forestry environment) and performs one or more actions in the environment. Portions of the environment may include moisture, such as puddles or mud patches. A control system associated with the vehicle may include a traversability model or a moisture model to help the vehicle operate in the environment with the moisture. In particular, the control system may employ the traversability model to reduce the likelihood of the vehicle attempting to traverse an untraversable portion of the environment, and the control system may employ the moisture model to reduce the likelihood of the vehicle performing an action that will damage a portion of the environment.

20 Claims, 18 Drawing Sheets

(51) Int. Cl.
  *G05D 1/00* (2006.01)
  *G05D 1/02* (2020.01)
  *G06V 10/82* (2022.01)
  *G06V 20/56* (2022.01)
  *G07C 5/08* (2006.01)

(52) U.S. Cl.
  CPC ........... *G05D 1/0246* (2013.01); *G06V 10/82* (2022.01); *G06V 20/588* (2022.01); *G07C 5/0808* (2013.01)

(58) Field of Classification Search
  CPC ...... G06V 10/82; G06V 20/588; G06V 20/56; G07C 5/0808
  See application file for complete search history.

(56) References Cited

U.S. PATENT DOCUMENTS

| | | | |
|---|---|---|---|
| 6,427,781 B1 * | 8/2002 | Buhler | A01B 37/00 239/728 |
| 9,139,998 B1 * | 9/2015 | Conner, Jr. | B08B 9/04 |
| 9,658,201 B2 * | 5/2017 | Redden | A01C 21/007 |
| 10,912,251 B2 | 2/2021 | Pickett et al. | |
| 11,479,213 B1 | 10/2022 | Kentley-Klay | |
| 2008/0131202 A1 | 6/2008 | Slater | |
| 2012/0237083 A1 * | 9/2012 | Lange | G06F 16/29 382/103 |
| 2012/0323452 A1 | 12/2012 | Green et al. | |
| 2014/0236431 A1 | 8/2014 | Hendrickson et al. | |
| 2015/0338848 A1 * | 11/2015 | Kumar | G07C 5/0816 701/29.2 |
| 2016/0108606 A1 * | 4/2016 | Strutynsky | E02F 5/103 37/351 |
| 2018/0025560 A1 * | 1/2018 | Matsuzaki | A01D 41/127 701/23 |
| 2018/0050704 A1 * | 2/2018 | Tascione | G07C 5/0808 |
| 2018/0070527 A1 * | 3/2018 | Richt | A01B 79/005 |
| 2018/0092295 A1 | 4/2018 | Sugumaran et al. | |
| 2018/0257657 A1 * | 9/2018 | Blank | B60W 30/18172 |
| 2018/0271015 A1 | 9/2018 | Redden et al. | |
| 2019/0129435 A1 | 5/2019 | Madsen et al. | |
| 2019/0217864 A1 | 7/2019 | Kusukame et al. | |
| 2019/0362146 A1 | 11/2019 | Polzounov et al. | |
| 2020/0029490 A1 | 1/2020 | Bertucci et al. | |
| 2020/0093054 A1 | 3/2020 | Aesaert et al. | |
| 2020/0107490 A1 | 4/2020 | Zemenchik | |
| 2020/0114843 A1 * | 4/2020 | Foster | G07C 5/0825 |
| 2020/0128734 A1 * | 4/2020 | Brammeier | A01D 41/1275 |
| 2020/0193589 A1 | 6/2020 | Peshlov et al. | |
| 2020/0236834 A1 | 7/2020 | Balani et al. | |
| 2020/0344939 A1 | 11/2020 | Sporrer et al. | |
| 2021/0029865 A1 | 2/2021 | Smith et al. | |
| 2021/0120730 A1 | 4/2021 | Anderson | |
| 2021/0149406 A1 * | 5/2021 | Javault | A01C 21/005 |
| 2021/0191409 A1 * | 6/2021 | Ready-Campbell | G05D 1/0219 |
| 2021/0192294 A1 | 6/2021 | Stanhope et al. | |
| 2021/0251128 A1 * | 8/2021 | Rupp | A01B 27/005 |
| 2021/0321568 A1 * | 10/2021 | Garton | A01D 75/182 |
| 2022/0026921 A1 * | 1/2022 | Halder | B60W 60/00 |
| 2022/0117215 A1 | 4/2022 | Sibley et al. | |
| 2022/0183209 A1 | 6/2022 | Scott-Robinson et al. | |
| 2022/0269282 A1 * | 8/2022 | Ascherl | G05D 1/0238 |
| 2022/0406104 A1 | 12/2022 | Maeder et al. | |
| 2023/0039092 A1 * | 2/2023 | Anderson | A01M 7/0089 |
| 2023/0040430 A1 * | 2/2023 | Redden | G06V 20/13 |
| 2023/0121070 A1 | 4/2023 | Kanai et al. | |
| 2023/0255137 A1 * | 8/2023 | McMahan | A01C 7/105 340/684 |
| 2024/0026655 A1 | 1/2024 | Stander et al. | |

OTHER PUBLICATIONS

PCT Invitation to Pay Additional Fees, PCT Application No. PCT/US22/39462, Aug. 4, 2022, 2 pages.
United States Office Action, U.S. Appl. No. 17/396,193, Nov. 22, 2023, 32 pages.
United States Office Action, U.S. Appl. No. 17/396,170, Aug. 25, 2023, 15 pages.
PCT International Search Report and Written Opinion, PCT Application No. PCT/US22/39085, Oct. 31, 2022, 15 pages.
Rankin, A.L. et al., "Daytime Water Detection by Fusing Multiple Cues for Autonomous Off-Road Navigation," 24th Army Science Conference, Nov. 2004, pp. 1-8.
European Patent Office, Extended European Search Report, European Patent Application No. 22853778.3, Jan. 16, 2025, 10 pages.
United States Office Action, U.S. Appl. No. 17/396,193, filed Dec. 27, 2024, 27 pages.

* cited by examiner

DETECTING UNTRAVERSABLE ENVIRONMENT AND PREVENTING DAMAGE BY A VEHICLE

CROSS-REFERENCE TO RELATED APPLICATIONS

This application claims priority to U.S. Provisional patent application Ser. No. 63/230,430, "Detecting Untraversable Soil and Preventing Damage by A Construction Machine," filed on Aug. 6, 2021, the subject matter of which is incorporated herein by reference in its entirety.

BACKGROUND

Field of Disclosure

This disclosure relates to operating a vehicle in an environment with moisture, and, more specifically, to preventing the vehicle from attempting to traverse untraversable areas in the environment or from damaging the environment.

Description of the Related Art

Operating a vehicle in an environment with moisture, such as puddles and mud, can pose difficulties for an operator of the vehicle. An environment with moisture can increase the likelihood of the vehicle becoming immobilized (e.g., getting stuck) in the environment or damaging the environment (e.g., forming a water run-off channel). An immobilized vehicle can be difficult to free, can delay operations, and can damage the environment, which may delay a timeline for a project for the environment. Preventing the vehicle from becoming immobilized or damaging the environment often requires knowledge of the capabilities of the vehicle and of the amount of moisture in the environment. This knowledge may be difficult to ascertain or may require the operator to have extensive working experience with the vehicle and the environment.

SUMMARY

A vehicle (e.g., a farming, construction, mining, or forestry vehicle) moves through an environment (e.g., a farming, construction, mining, or forestry environment) and performs one or more actions (e.g., farming, construction, mining, or forestry actions) in the environment. Portions of the environment may include moisture, such as puddles or mud patches. A control system associated with the vehicle may include a traversability model or a moisture model to help the vehicle operate in the environment.

In some embodiments, to reduce the likelihood of a vehicle becoming immobilized in an environment portion (e.g., due to moisture in the environment portion), the control system applies the traversability model to an image of the environment portion (the image may be captured by an image sensor of the vehicle). By analyzing pixels in the image, the traversability model determines a moisture level of the environment portion and determines a traversability difficulty of the environment portion using the moisture level. The traversability difficulty quantifies a level of difficulty for a vehicle to move through the portion of the environment. If the traversability difficulty is above a traversability capability of the vehicle, the vehicle performs an action, such as modifying the vehicle's route, so that it does not move through the portion of the environment.

In some embodiments, to reduce the likelihood of a vehicle damaging a portion of an environment (e.g., due to the moisture in the environment portion), the control system applies the moisture model to the image of the environment portion. The moisture model determines a measure of moisture for the environment portion of the environment using the image. Based on the determined measure of moisture, the control system determines a likelihood that the vehicle performing the action will damage the portion of the environment. If the likelihood is above a threshold likelihood, the vehicle performs another action, where the likelihood that the vehicle performing the other action will damage the portion of the environment is below the threshold likelihood.

The descriptions above are applicable to a variety of different environments and vehicles, such as construction vehicles (e.g., motor graders), agricultural or farming vehicles (e.g., tractors), or forestry vehicles (e.g., forwarders).

Figure 1A:
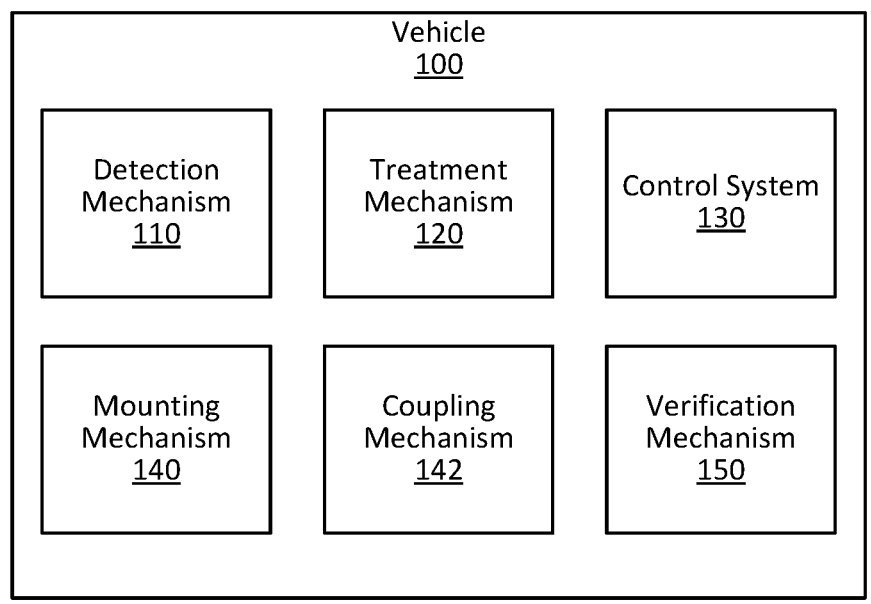
FIG. 1A illustrates a block diagram of a that performs actions of a treatment plan, in accordance with an example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

A vehicle (e.g., a farming, construction, mining, or forestry vehicle) includes one or more sensors capturing information about the surroundings as the vehicle moves through an environment. The environment can include various objects (e.g., ground and obstructions) used to determine actions (e.g., performing a treatment action, modifying a treatment parameter, modifying an operational parameter, and modifying a sensor parameter, etc.) for the vehicle to operate in the environment.

The vehicle includes a control system that processes the information obtained by the sensors to generate corresponding actions. For example, the control system processes information to identify objects to generate corresponding treatment actions. There are many examples of a vehicle (e.g., a farming vehicle) processing visual information obtained by an image sensor coupled to the vehicle to identify and treat plants and identify and avoid obstructions. For example, the vehicle as described in U.S. patent application Ser. No. 16/126,842 titled "Semantic Segmentation to Identify and Treat Plants in a Construction environment and Verify the Plant Treatments," filed on Sep. 10, 2018, which is hereby incorporated by reference in its entirety.

II. Environment Management and Treatment Plans

Environment Management

Managers (e.g., agricultural, construction, mining, or forestry managers) are responsible for managing operations in one or more environments. Managers work to implement an objective (e.g., a farming, construction, mining, or forestry objective) within those environments and select from among a variety of actions (e.g., farming, construction, mining, or forestry actions) to implement that objective. Traditionally, managers are, for example, a human (e.g., agronomist) that works the environment (e.g., agricultural field) but could also be other systems configured to manage operations within the environment. For example, a manager could be an automated machine (e.g., vehicle), a machine learned computer model, etc. In some cases, a manager may be a combination of the managers described above. For example, a manager may include a human assisted by a machine learned model and one or more automated machines.

Managers implement one or more objectives for an environment. An objective is typically a macro-level goal for an environment. For example, macro-level farming objectives may include treating crops with growth promotors, neutralizing weeds with growth regulators, harvesting a crop with the best possible crop yield, or any other suitable farming objective. However, objectives may also be a micro-level goal for the environment. For example, micro-level farming objectives may include treating a particular plant in the environment, repairing, or correcting a part of a farming vehicle, requesting feedback from a manager, etc. Of course, there are many possible objectives and combinations of objectives, and the previously described examples are not intended to be limiting.

Objectives are accomplished (at least in part) by one or more vehicles performing a series of actions. Example, vehicles are described in greater detail below. Actions (e.g., farming, construction, mining, or forestry actions) are any operation implementable by a vehicle within the environment that works towards an objective. Consider, for example, a farming objective of harvesting a crop with the best possible yield. This farming objective requires a litany of farming actions, e.g., planting the environment, fertilizing the plants, watering the plants, weeding the environment, harvesting the plants, evaluating yield, etc. Similarly, each farming action pertaining to harvesting the crop may be a farming objective in and of itself. For instance, planting the environment (e.g., field) can require its own set of farming actions, e.g., preparing the ground (e.g., soil), digging in the ground, planting a seed, etc.

In other words, managers implement a treatment plan (e.g., farming, construction, mining, or forestry treatment plan) in the environment to accomplish an objective. A treatment plan is a hierarchical set of macro-level or micro-level objectives that accomplish the objective of the manager. Within a treatment plan, each macro or micro-objective may require a set of actions to accomplish, or each macro or micro-objective may be an action itself. So, to expand, the treatment plan is a temporally sequenced set of actions to apply to the environment that the manager expects will accomplish the objective.

When executing a treatment plan in an environment, the treatment plan itself or its constituent objectives and actions have various results. A result is a representation as to whether, or how well, a vehicle accomplished the treatment plan, objective, or action. A result may be a qualitative measure such as "accomplished" or "not accomplished," or may be a quantitative measure such as "40 pounds harvested," or "1.25 acres treated." Results can also be positive or negative, depending on the configuration of the vehicle or the implementation of the treatment plan. Moreover, results can be measured by sensors of the vehicle, input by managers, or accessed from a datastore or a network.

Traditionally, managers have leveraged their experience, expertise, and technical knowledge when implementing actions in a treatment plan. In a first example, a manager may spot check weed pressure in several areas of the environment (e.g., field) to determine when an environment is ready for weeding. In a second example, a manager may refer to previous implementations of a treatment plan to determine the best time to begin planting an environment (e.g., field). In a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For example, farming actions in a treatment plan have historically been applied to an entire environment (e.g., field) rather than small portions of the environment. To illustrate this example further, when a manager decides to plant a crop, they plant the entire environment instead of just a corner of the environment having the best planting conditions; or, when the manager decides to weed the environment, they weed the entire environment rather than just a few rows. Similarly, each action in a sequence of actions of a treatment plan are historically performed at approximately the same time. For example, when a manager decides to fertilize an environment (e.g., field), they fertilize the environment at approximately the same time; or, when the manager decides to harvest the environment, they do so at approximately the same time.

Notably though, vehicles have greatly advanced in their capabilities. For example, vehicles continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of actions in a treatment plan. Instead, managers may leverage advanced capabilities of vehicles to implement treatment plans that are highly localized and determined by real-time measurements in the environment. In other words, rather than a manager applying a "best guess" treatment plan to an entire environment, they can implement individualized and informed treatment plans for each plant in the environment.

III. Example Vehicles

FIG. 1A is a block diagram of a vehicle 100 (also referred to as a work vehicle) that performs actions of a treatment plan, according to an example embodiment. The vehicle 100 may be a vehicle used for farming (e.g., a tractor), construction (e.g., a motor grader), mining (e.g., a dragline excavator), or forestry (e.g., a forwarder). In the example of FIG. 1A, the vehicle 100 includes a detection mechanism 110, a treatment mechanism 120, a control system 130, a mounting mechanism 140, a coupling mechanism 142, and a verification mechanism 150. The described components and functions of the vehicle 100 are just examples, and a vehicle can have different or additional components and functions other than those described below. For example, the vehicle may also include a power source, digital memory, communication apparatus, or any other suitable component that enables the vehicle 100 to implement actions in a treatment plan.

Operating Environment

The vehicle 100 operates in an operating environment 102 (also referred to as the environment 102). The environment 102 is a geographic area where the vehicle 100 implements actions of a treatment plan. Example environments include a farming field (indoor or outdoor), a construction site, a mining area, and a forest. An environment may include any number of environment portions. An environment portion is a subunit of an environment. The vehicle 100 can execute different actions for different environment portions. Moreover, an environment and an environment portion are largely interchangeable in the context of the methods and systems described herein. That is, treatment plans and their corresponding actions may be applied to an entire environment or an environment portion depending on the circumstances at play.

The operating environment 102 may include the ground and objects in, on, or above the ground. As such, actions the vehicle 100 implements as part of a treatment plan may be applied to the ground. The ground may include soil but can alternatively include sponge or any other suitable ground type.

Detection Mechanism(s)

The vehicle 100 may include a detection mechanism 110. The detection mechanism 110 identifies objects in the operating environment 102 of the vehicle 100. To do so, the detection mechanism 110 obtains information describing the environment 102 (e.g., sensor or image data), and processes that information to identify pertinent objects (e.g., plants, the ground, persons, etc.) in the operating environment 102. Identifying objects in the environment 102 further enables the vehicle 100 to implement actions in the environment.

The vehicle 100 can include any number or type of detection mechanism 110 that may aid in determining and implementing actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the vehicle 100. For example, the detection mechanism 110 may include an array of cameras configured to capture an array of pictures representing the environment 102 surrounding the vehicle 100. The detection mechanism 110 may also be a sensor that measures a state of the vehicle 100. For example, the detection mechanism 110 may be a speed sensor, a heat sensor, or some other sensor that can monitor the state of a component of the vehicle 100.

A detection mechanism 110 may be mounted at any point on the mounting mechanism 140. Depending on where the detection mechanism 110 is mounted relative to the treatment mechanism 120, one or the other may pass over a geographic area in the environment before the other. For example, the detection mechanism 110 may be positioned on the mounting mechanism 140 such that it traverses over a geographic location before the treatment mechanism 120 as the vehicle 100 moves through the environment. In another examples, the detection mechanism 110 is positioned to the mounting mechanism 140 such that the two traverse over a geographic location at substantially the same time as the vehicle 100 moves through the environment. Similarly, the detection mechanism 110 may be positioned on the mounting mechanism 140 such that the treatment mechanism 120 traverses over a geographic location before the detection mechanism 110 as the vehicle 100 moves through the environment. The detection mechanism 110 may be statically mounted to the mounting mechanism 140 or may be removably or dynamically coupled to the mounting mechanism 140. In other examples, the detection mechanism 110 may be mounted to some other surface of the vehicle 100 or may be incorporated into another component of the vehicle 100.

Verification Mechanism(s)

The vehicle 100 may include a verification mechanism 150. Generally, the verification mechanism 150 records a measurement of the operating environment 102 and the vehicle 100 may use the recorded measurement to verify or determine the extent of an implemented action (i.e., a result of the action).

To illustrate, consider an example where a vehicle 100 implements an action based on a measurement of the operating environment 102 by the detection mechanism 110. The verification mechanism 150 records a measurement of the same geographic area measured by the detection mechanism 110 and where vehicle 100 implemented the determined action. The vehicle 100 then processes the recorded measurement to determine the result of the action. For example, the verification mechanism 150 may record an image of an object (e.g., tree) in a geographic region identified by the detection mechanism 110 and treated by a treatment mechanism 120. The vehicle 100 may apply a treatment detection algorithm to the recorded image to determine the result of the treatment applied to the object.

Information recorded by the verification mechanism 150 can also be used to empirically determine operation parameters of the vehicle 100 that will obtain the desired effects of implemented actions (e.g., to calibrate the vehicle 100, to modify treatment plans, etc.). For instance, the vehicle 100 may apply a calibration detection algorithm to a measurement recorded by the vehicle 100. In this case, the vehicle 100 determines whether the actual effects of an implemented action are the same as its intended effects. If the effects of the implemented action are different than its intended effects, the vehicle 100 may perform a calibration process. The calibration process changes operation parameters of the vehicle 100 such that effects of future implemented actions are the same as their intended effects. To illustrate, consider the previous example where the vehicle 100 recorded an image of a treated object (e.g., a tree). There, the vehicle 100 may apply a calibration algorithm to the recorded image to determine whether the treatment is appropriately calibrated (e.g., at its intended location in the operating environment 102). If the vehicle 100 determines that the vehicle 100 is not calibrated (e.g., the applied treatment is at an incorrect location), the vehicle 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the vehicle 100.

The vehicle 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the vehicle 100. For example, the verification mechanism 150 may include an array of cameras configured to capture an array of pictures representing the operating environment 102.

Treatment Mechanism(s)

The vehicle 100 may include a treatment mechanism 120. The treatment mechanism 120 can implement actions in the operating environment 102 of a vehicle 100 (although not all actions need to be performed by the treatment mechanism 120). For instance, a vehicle 100 may include a treatment mechanism 120 that applies a treatment to an object in the operating environment 102. More generally, the vehicle 100 employs the treatment mechanism 120 to apply a treatment to a treatment area, and the treatment area may include anything within the operating environment 102 (e.g., a plant or the ground). In other words, the treatment area may be any portion of the operating environment 102.

If a treatment is a plant treatment, the treatment mechanism 120 applies a treatment to a plant in the environment. The treatment mechanism 120 may apply treatments to identified plants or non-identified plants. For example, the vehicle 100 may identify and treat a specific plant in the environment. Alternatively, or additionally, the vehicle 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant treatment mechanisms 120 are also possible.

If the treatment is a ground treatment, the treatment mechanism 120 applies a treatment to some portion of the ground in the environment. The treatment mechanism 120 may apply treatments to identified areas of the ground, or non-identified areas of the ground. For example, the vehicle 100 may identify and treat an area of ground in the environment. Alternatively, or additionally, the vehicle 100 may identify some other trigger that indicates a ground treatment and the treatment mechanism 120 may apply a treatment to the ground. Some example treatment mechanisms 120 configured for applying treatments to the ground include: one or more spray nozzles, one or more electromagnetic energy sources, one or more physical implements configured to manipulate the ground (e.g., an excavator tool or pile driver tool), but other ground treatment mechanisms 120 are also possible.

Of course, the vehicle 100 is not limited to treatment mechanisms 120 for plants and the ground. The vehicle 100 may include treatment mechanisms 120 for applying various other treatments to objects in the environment.

Depending on the configuration, the vehicle 100 may include various numbers of treatment mechanisms 120 (e.g., 1, 2, 5, 20, 60, etc.). A treatment mechanism 120 may be fixed (e.g., statically coupled) to the mounting mechanism 140 or attached to the vehicle 100. Alternatively, or additionally, a treatment mechanism 120 may be movable (e.g., translatable, rotatable, etc.) on the vehicle 100. In one configuration, the vehicle 100 includes a single treatment mechanism 120. In this case, the treatment mechanism 120 may be actuatable to align the treatment mechanism 120 to a treatment area 122. In a second variation, the vehicle 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area. Similarly, either the single, combination, or entire assembly may be actuated to align with a treatment area, as needed. In some configurations, the vehicle 100 may align a treatment mechanism 120 with an identified object in the operating environment 102. That is, the vehicle 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The vehicle 100 includes a control system 130. The control system 130 controls operation of the various components and systems on the vehicle 100. For instance, the control system 130 can obtain information about the operating environment 102, processes that information to identify an action to implement, and implement the identified action with system components of the vehicle 100.

The control system 130 can receive information from the detection mechanism 110, the verification mechanism 150, the treatment mechanism 120, or any other component or system of the vehicle 100. For example, the control system 130 may receive measurements from the detection mechanism 110 or verification mechanism 150, or information relating to the state of a treatment mechanism 120 or implemented actions from a verification mechanism 150. Other information is also possible.

Similarly, the control system 130 can provide input to the detection mechanism 110, the verification mechanism 150, or the treatment mechanism 120. For instance, the control system 130 may be configured to input and control operating parameters of the vehicle 100 (e.g., speed or direction). Similarly, the control system 130 may be configured to input and control operating parameters of the detection mechanism 110 or verification mechanism 150. Operating parameters of the detection mechanism 110 or verification mechanism 150 may include processing time, location, or angle of the detection mechanism 110, image capture intervals, image capture settings, etc. Other inputs are also possible. The control system may be configured to generate machine inputs for the treatment mechanism 120. That is translating an action of a treatment plan into machine instructions implementable by the treatment mechanism 120.

The control system 130 can be operated by a user operating the vehicle 100, wholly or partially autonomously, operated by a user connected to the vehicle 100 by a network, or any combination of the above. For instance, the control system 130 may be operated by a manager sitting in a cabin of the vehicle 100, or the control system 130 may be operated by a manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the vehicle 100 and connected by a local area network. In another example, the control system 130 may be a series of computers implemented on the vehicle 100, in the cloud, a client device and connected by a wireless area network.

The control system 130 can apply one or more computer models to determine and implement actions in the environment. For example, in an example farming context, the control system 130 can apply a plant identification module to images acquired by the detection mechanism 110 to determine and implement actions. The control system 130 may be coupled to the vehicle 100 such that an operator (e.g., a driver) can interact with the control system 130. In other embodiments, the control system 130 is physically removed from the vehicle 100 and communicates with system components (e.g., detection mechanism 110, treatment mechanism 120, etc.) wirelessly.

In some configurations, the vehicle 100 may additionally include a communication apparatus, which functions to communicate (e.g., send or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Vehicle Components

In various configurations, the vehicle 100 may include any number of additional components.

For instance, the vehicle 100 may include a mounting mechanism 140. The mounting mechanism 140 provides a mounting point for the components of the vehicle 100. That is, the mounting mechanism 140 may be a chassis or frame to which components of the vehicle 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150.

The vehicle 100 may include locomoting mechanisms. The locomoting mechanisms may include any number of wheels, continuous treads, articulating legs, or some other locomoting mechanism(s). For instance, the vehicle 100 may include a first set and a second set of coaxial wheels, or a first set and a second set of continuous treads. In the either example, the rotational axis of the first and second set of wheels/treads are approximately parallel. Further, each set may be arranged along opposing sides of the vehicle 100. Typically, the locomoting mechanisms are attached to a drive mechanism that causes the locomoting mechanisms to translate the vehicle 100 through the operating environment 102. For instance, the vehicle 100 may include a drive train for rotating wheels or treads. In different configurations, the vehicle 100 may include any other suitable number or combination of locomoting mechanisms and drive mechanisms.

The vehicle 100 may also include one or more coupling mechanisms 142 (e.g., a hitch). The coupling mechanism 142 functions to removably or statically couple various components of the vehicle 100. For example, a coupling mechanism may attach a drive mechanism to a secondary component such that the secondary component is pulled behind the vehicle 100. In another example, a coupling mechanism may couple one or more treatment mechanisms 120 to the vehicle 100.

The vehicle 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the vehicle 100.

Example vehicles 100 configured for various environments are further described below with reference to FIGS. 1B-1G.

III.A Example Farming Vehicles

An example embodiment of vehicle 100 is a farming vehicle. A farming vehicle is a vehicle configured to operate in a farming environment and to accomplish (or contribute to accomplishing) one or more objectives in the farming environment. A farming action may be any operation implementable by a farming vehicle within the farming environment that works towards the one or more objectives. Farming vehicles can include a wide variety of vehicles (e.g., tractors, drapers, balers, tillers, and harvesters) which can perform a variety of farming actions (e.g., planting, spraying, weeding, pruning, and harvesting) in farming treatment plans to accomplish farming objectives (e.g., planting a field or applying a pesticide to a field). An example farming environment is a field (e.g., for growing crops).

Figure 1B:
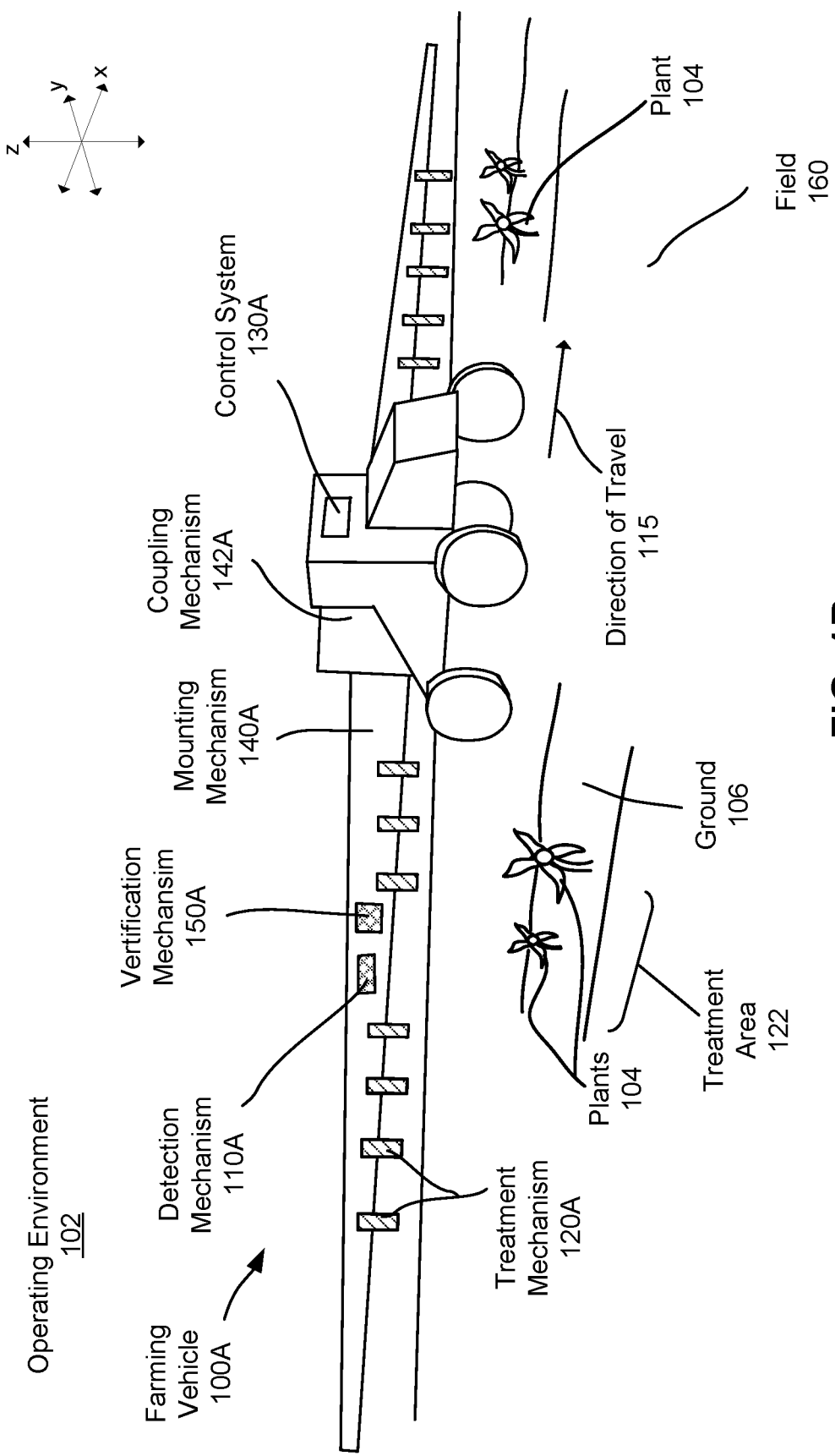
FIG. 1B illustrates an isometric view of a farming vehicle, in accordance with an example embodiment.
Figure 1C:
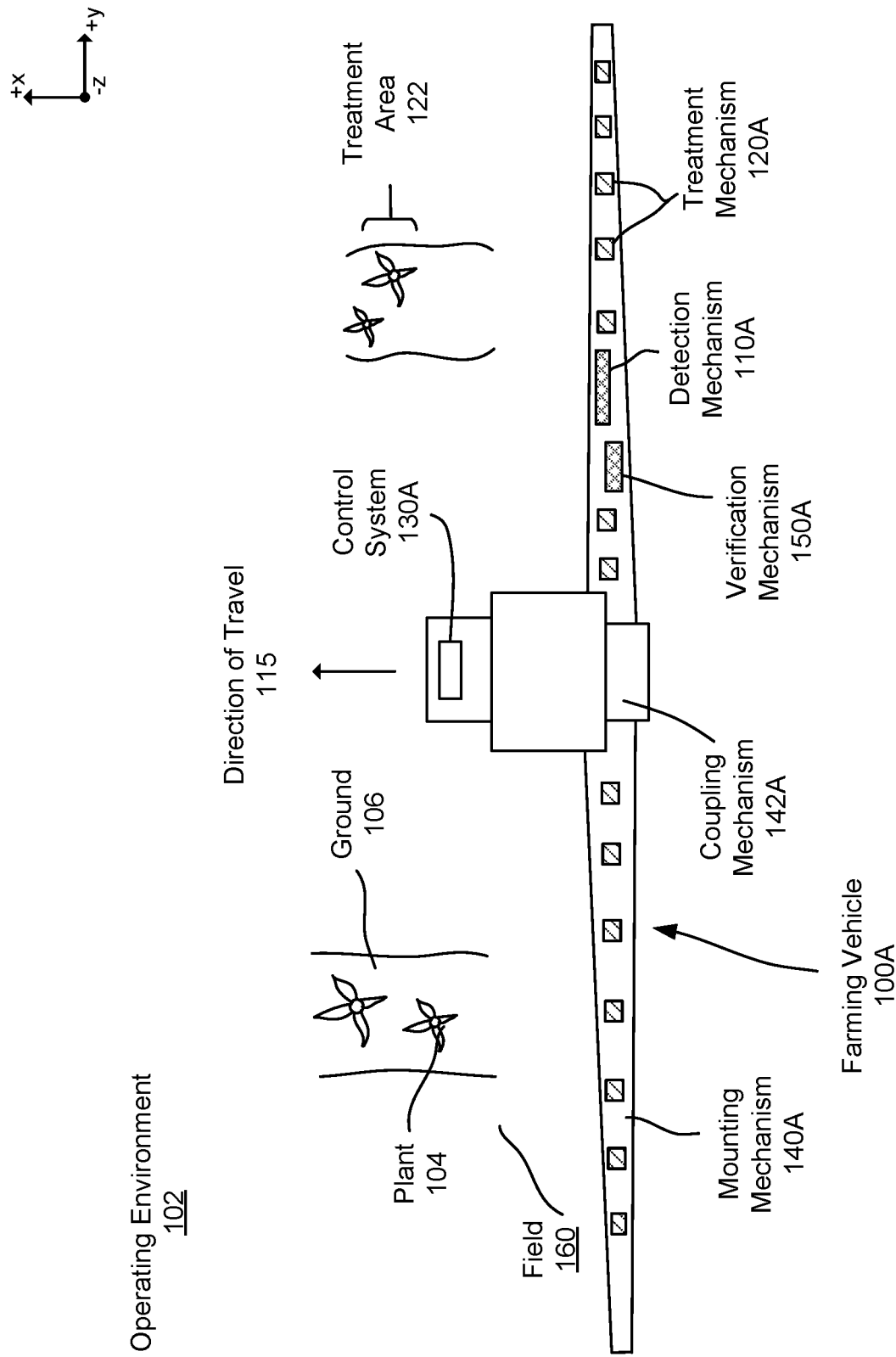
FIG. 1C illustrates a top view of the farming vehicle in FIG. 1B, in accordance with the example embodiment.
Figure 1D:
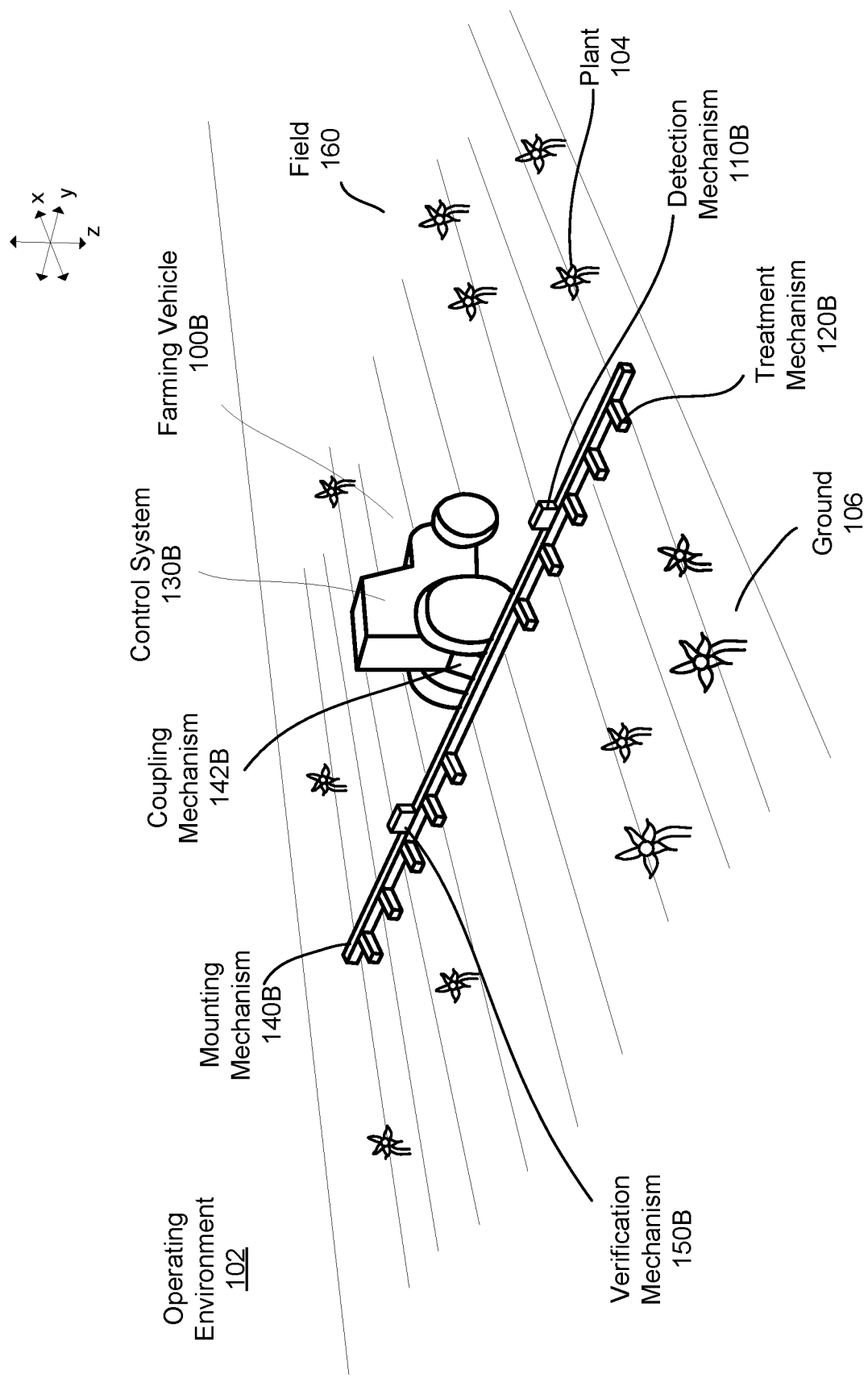
FIG. 1D illustrates an isometric view of a second farming vehicle, in accordance with an example embodiment.

FIGS. 1B-1D illustrate example farming vehicles (100A, 100B), according to some embodiments. Specifically, FIG. 1B is an isometric view of a tractor farming vehicle 100A that performs farming actions of a treatment plan, according to one example embodiment, and FIG. 1C is a top view of the farming vehicle 100A in FIG. 1B. FIG. 1D is an isometric view of another tractor farming vehicle 100B that performs farming actions of a treatment plan, in accordance with one example embodiment. As illustrated, the farming vehicles (100A, 100B) each include a detection mechanism (110A, 110B), a treatment mechanism (120A, 120B), a control system (130A, 130B), a mounting mechanism (140A, 140B), a coupling mechanism (142A, 142B), and a verification mechanism (150A, 150B), which are example embodiments of the corresponding components in FIG. 1A.

The farming vehicles in FIGS. 1B-1D are each configured to implement a farming action which applies a treatment to one or more plants 104 or the ground 106 within the environment 102. A treatment farming action may be included in a treatment plan to regulate plant growth. As such, treatments may be applied directly to a single plant 104 but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

If the treatment is a plant treatment, the effect of treating a plant with a treatment mechanism (e.g., 120A) may include any of plant necrosis, plant growth stimulation, plant portion necrosis or removal, plant portion growth stimulation, or any other suitable treatment effect. Moreover, the treatment mechanism can apply a treatment that dislodges a plant 104 from the ground 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, or injects one or more working fluids into the ground 106 adjacent to a plant 104 (e.g., within a threshold distance from the plant). Other plant treatments are also possible. When applying a plant treatment, the treatment mechanisms may be configured to spray one or more of: an herbicide, a fungicide, insecticide, some other pesticide, or water.

In a particular example, the farming vehicle is configured to implement an action which applies a treatment that necroses the entire plant 104 (e.g., weeding) or part of the plant 104 (e.g., pruning). In this case, the action can include dislodging the plant 104 from the ground 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner. In another example, a farming vehicle (e.g., 100A) is configured to implement an action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or ground 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

In the examples of FIGS. 1B-1D, the mounting mechanism (140A, 140B) extends outward from a body of the farming vehicle (100A, 100B) such that the mounting mechanism 140 is approximately perpendicular to the direction of travel 115. In some configurations, the mounting mechanism (140A, 140B) may include an array of treatment mechanisms (120A, 120B) positioned laterally along the mounting mechanism (140A, 140B). In some configurations, the farming vehicle (100A, 100B) may not include a mounting mechanism (140A, 140B), the mounting mechanism (140A, 140B) may be alternatively positioned, or the mounting mechanism (140A, 140B) may be incorporated into any other component of the vehicle (100A, 100B).

The plants 104 can be crops but can also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed. More generally, plants 104 may include a stem that is arranged superior to (e.g., above) the ground 106 and a root system joined to the stem that is located inferior to the plane of the ground 106 (e.g., below ground). The stem may support any branches, leaves, or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the ground 106. In various examples, the plant 104 may be a vascular plant 104, non-vascular plant 104, ligneous plant 104, herbaceous plant 104, or be any suitable type of plant 104.

Plants 104 in an environment may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within an environment may include the same type of crop (e.g., same genus, same species, etc.). For example, each portion in an environment may include corn crops. However, the plants 104 within each environment may also include multiple crops (e.g., a first, a second crop, etc.). For example, some environment portions may include lettuce crops while other environment portions include pig weeds, or, in another example, some environment portions may include beans while other environment portions may include corn. Additionally, a single environment portion may include different types of crops. For example, a single environment portion may include a soybean plant 104 and a grass weed.

III.B Example Construction Vehicles

Another example embodiment of vehicle 100 is a construction vehicle. A construction vehicle is a vehicle configured to operate in a construction environment and to accomplish (or contribute to accomplishing) one or more objectives in the construction environment. A construction action may be any operation implementable by a construction vehicle within the construction environment that works towards the one or more objectives. Construction vehicles can include a wide variety of vehicles (e.g., bulldozers, front loaders, dump trucks, backhoes, graders, trenchers, cranes, loaders, crawler dozers, compactors, forklifts, conveyors, and mixer trucks) which can perform a variety of construction actions (e.g., excavating, pile driving, loading objects, unloading objects, lifting objects, clearing debris, grading, and digging trenches) in construction treatment plans to accomplish construction objectives (e.g., building a road, digging a trench, digging a hole, clearing a portion of dirt, or moving dirt from point A to point B).

An example construction environment that a construction vehicle can operate in is a construction site or project site. A construction environment may be an area used to construct, repair, maintain, improve, extend, or demolish buildings, infrastructure, or industrial facilities. A construction environment may include one or more of the following: a secure perimeter to restrict unauthorized access, site access control points, office and welfare accommodation for personnel from the main contractor and other firms involved in the project team, or storage areas for materials, machinery (e.g., construction vehicles), or equipment. In some cases, a construction environment is formed when the first feature of a permanent structure has been put in place, such as pile driving, or the pouring of slabs or footings.

Figure 1E:
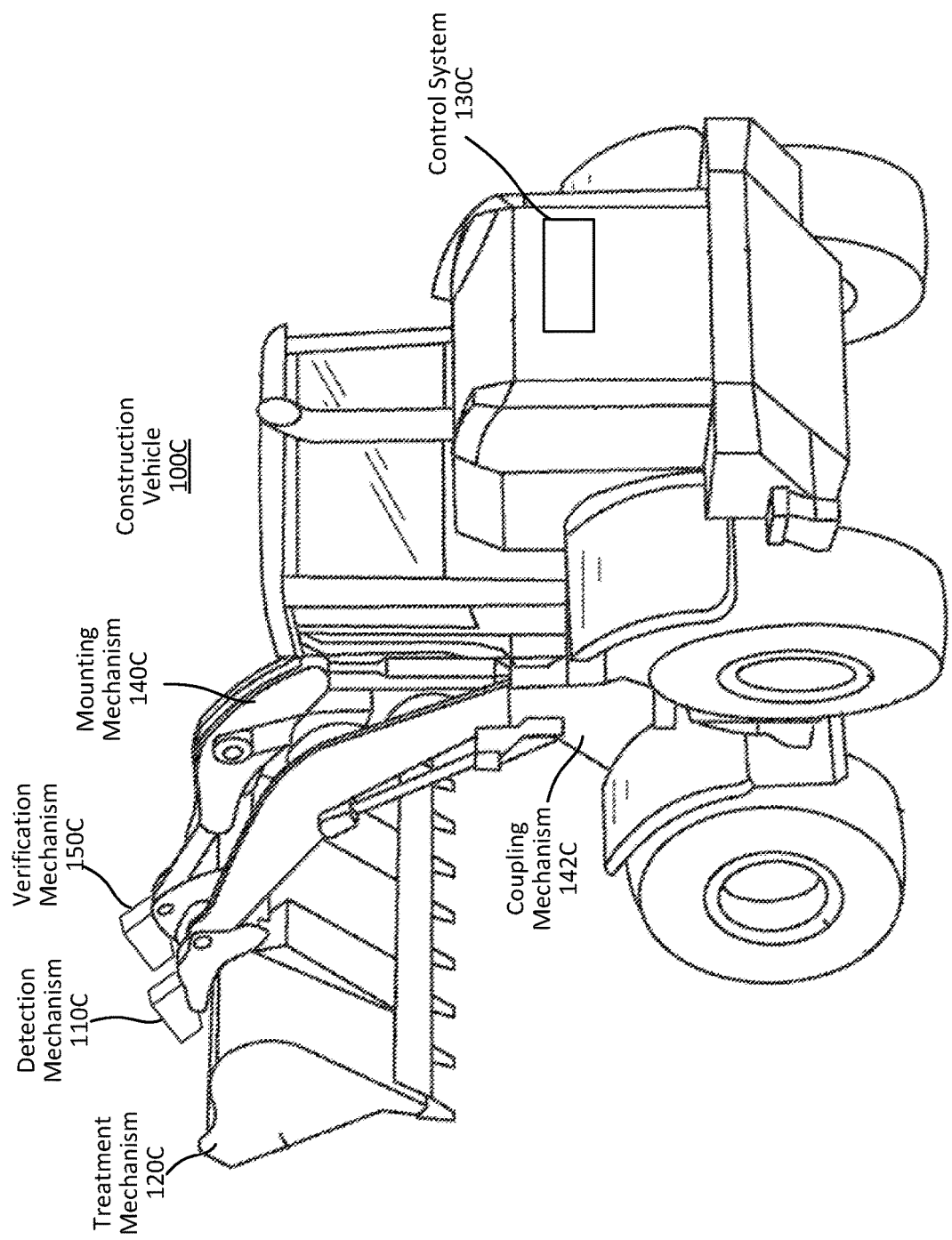
FIG. 1E illustrates an isometric view of a construction vehicle, in accordance with an example embodiment.
Figure 1F:
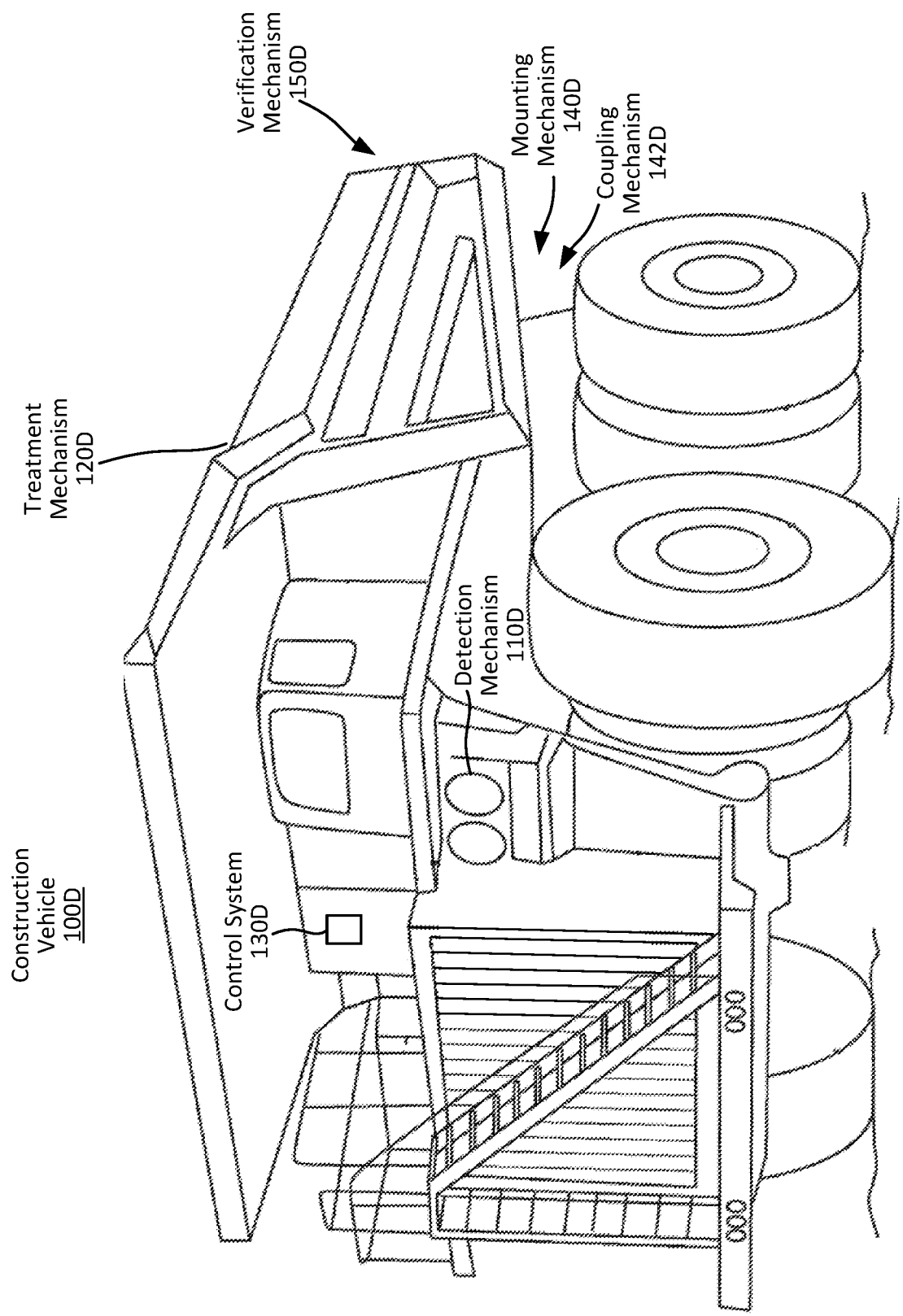
FIG. 1F illustrates an isometric view of a second construction vehicle, in accordance with an example embodiment.

FIGS. 1E and 1F illustrate example construction vehicles (100C, 100D), according to some embodiments. Specifically, FIG. 1E is an isometric view of a wheel loader construction vehicle 100C, and FIG. 1F is an isometric view of a dump truck construction vehicle 100D. As illustrated, each construction vehicle (100C, 100D) each include a detection mechanism (110C, 110D), a treatment mechanism (120C, 120D), a control system (130C, 130D), a mounting mechanism (140C, 140D), a coupling mechanism (142C, 142D), and a verification mechanism (150C, 150D), which are example component embodiments of the corresponding components in FIG. 1A.

In one example situation, the loader 100C in FIG. 1E is engaged in moving material from a pile to the treatment mechanism 120D (e.g., cargo bed) of the dump truck 100D in FIG. 1F. To fill the truck 100D, the loader 100C starts by moving forward along a path to pick up a load and, once at the pile, digs the treatment mechanism 120C (e.g., bucket) into the pile to fill the treatment mechanism 120C with material. Then, the loader 100C backs away from the pile, while turning to face the dump truck 100D. Then the loader drives to the dump truck 100D, raising its treatment mechanism 120C (e.g., bucket) and dumps the material into the treatment mechanism 120D of the dump truck 100D. Afterwards, the loader 100C backs up and turns to face the pile, repeating the process. As further described below, the loader 100C may encounter moisture during any of these construction actions or before or after the completion of the objective, in between objectives, or in other scenarios. The loader 100C or the dump truck 100D may employ a control system (130C, 130D) to identify moisture in the environment. For instance, the control system 130C may employ a traversability model to reduce the likelihood of the loader 100C becoming immobilized (e.g., getting stuck) in terrain, and may employ a moisture model to reduce the likelihood of the loader 100C performing an action that will damage the environment.

III. C Example Forestry Vehicles

Another example embodiment of vehicle 100 is a forestry vehicle. A forestry vehicle is a vehicle configured to operate in a forestry environment and to accomplish (or contribute to accomplishing) one or more objectives in the forestry environment. A forestry action may be any operation implementable by a forestry vehicle within the forestry environment that works towards the one or more objectives. Forestry vehicles can include a wide variety of vehicles (e.g., harvesters, skidders, feller bunchers, forwarders, and swing machines) which can perform a variety of forestry actions (e.g., felling, delimbing, bucking, forwarding, and sorting) in forestry treatment plans to accomplish forestry objectives (e.g., trimming a set of trees, felling a set of trees, or moving logs from point A to point B).

Example forestry environments that forestry vehicles can operates in include a forest, a woodland, and a logging site. A forestry environment may be an area used to create, manage, use, plant, conserve, or repair forests or woodlands. Generally, a forest is an area of land dominated by trees. For example, a forest is an area of land spanning more than 0.5 hectares with trees higher than 5 meters and a canopy cover of more than 10 percent, or trees able to reach these thresholds in situ. Typically, a forest does not include land that is predominantly under agricultural or urban use.

Figure 1G:
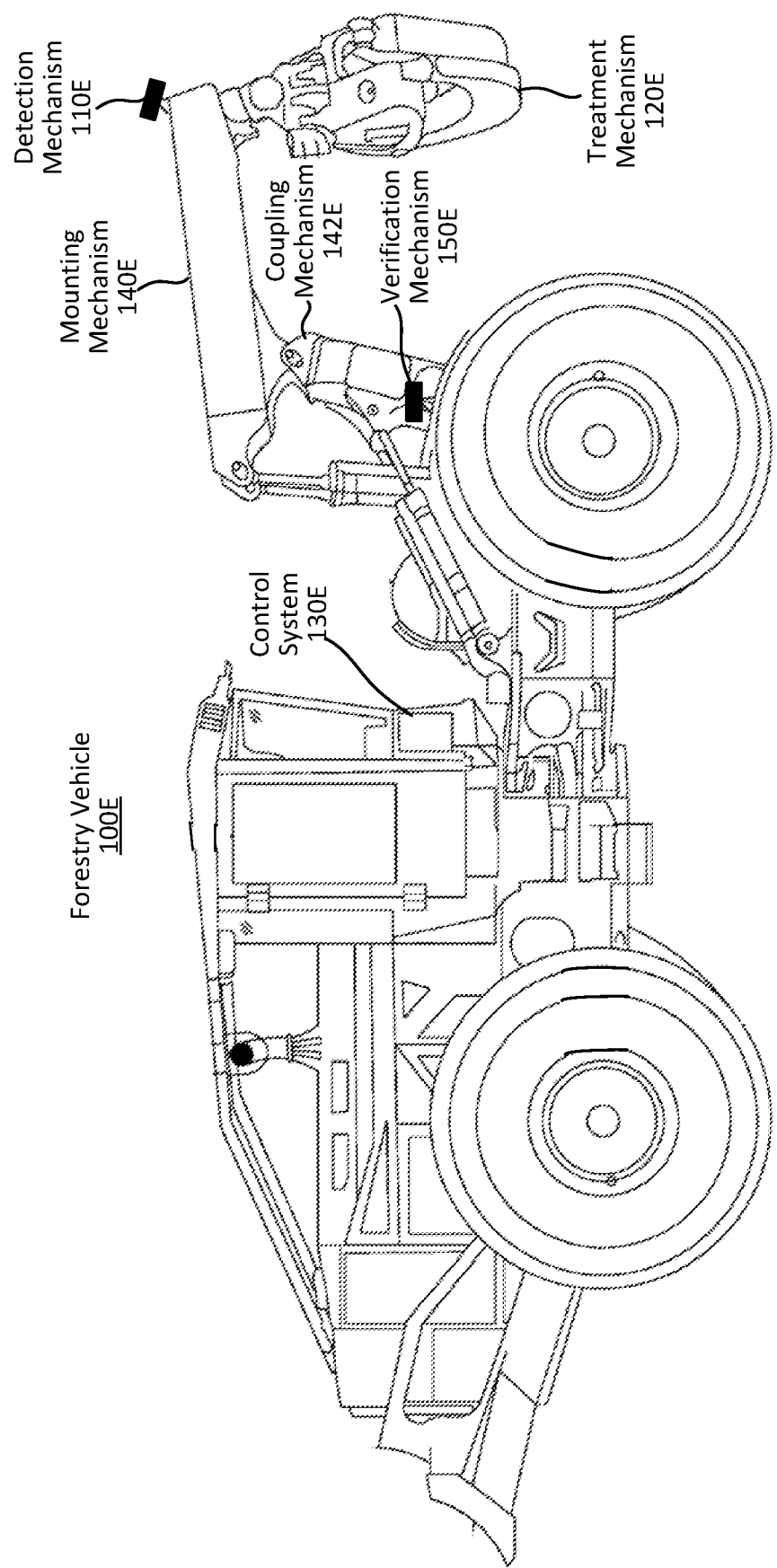
FIG. 1G illustrates a side view of a forestry vehicle, in accordance with an example embodiment.

FIG. 1G illustrates an example forestry vehicle 100E, according to an embodiment. Specifically, FIG. 1G is a side view of a skidder forestry vehicle 100E. As illustrated, the forestry vehicle 100E includes a detection mechanism 110E, a treatment mechanism 120E, a control system 130E, a mounting mechanism 140E, a coupling mechanism 142E, and a verification mechanism 150E, which are example component embodiments of the corresponding components in FIG. 1A.

IV. System Environment

Figure 2:
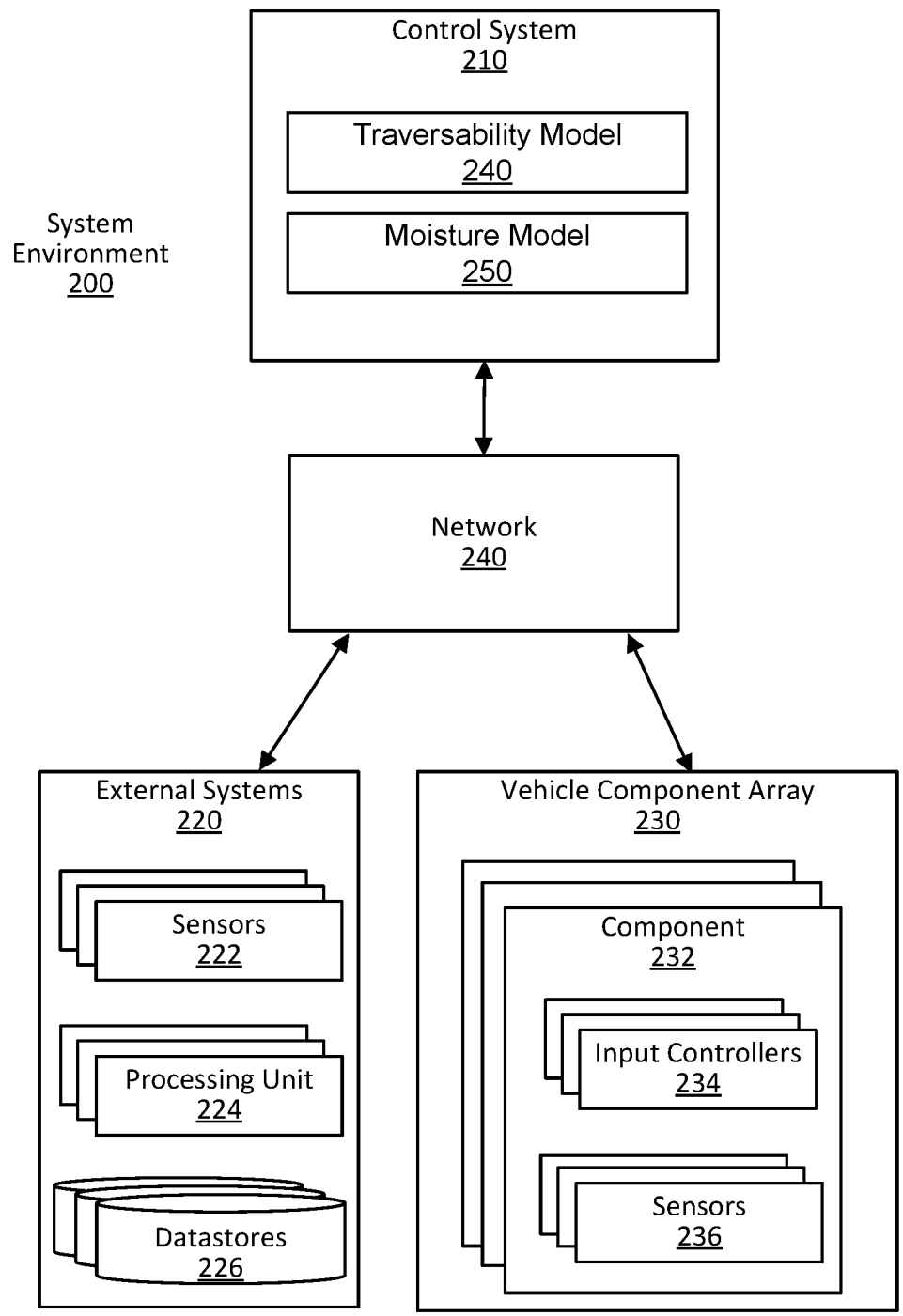
FIG. 2 illustrates a block diagram of the system environment for the vehicle, in accordance with an example embodiment.

FIG. 2 is a block diagram of the system environment for the vehicle 100, in accordance with one or more example embodiments. In this example, the control system 210 (e.g., control system 130) is connected to external systems 220 and a vehicle component array 230 via a network 240 within the system environment 200.

The external systems 220 are any system that can generate data representing information useful for determining and implementing actions in an environment. External systems 220 may include one or more sensors 222, one or more processing units 224, and one or more datastores 226. The one or more sensors 222 can measure the environment 102, the vehicle 100, etc. and generate data representing those measurements. For instance, the sensors 222 may include a rainfall sensor, a wind sensor, heat sensor, a camera, etc. The processing units 2240 may process measured data to provide additional information that may aid in determining and implementing actions in the environment. For instance, a processing unit 224 may access an image of an environment and may access historical weather information for an environment to generate a forecast for the environment. Datastores 226 store historical information regarding the vehicle 100, the operating environment 102, etc. that may be beneficial in determining and implementing actions. For instance, the datastore 226 may store results of previously implemented treatment plans and actions for an environment, a nearby environment, or the region. The historical information may have been obtained from one or more vehicles (i.e., measuring the result of an action from a first vehicle with the sensors of a second vehicle). Further, the datastore 226 may store results of specific actions in the environment, or results of actions taken in nearby environments having similar characteristics. The datastore 226 may also store historical weather, flooding, environment use, objects in the environment, etc. for the environment and the surrounding area. Finally, the datastores 226 may store any information measured by other components in the system environment 200.

The vehicle component array 230 includes one or more components 232. Components 232 are elements of the vehicle 100 that can take actions (e.g., a treatment mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 232 in response. A sensor 236 generates data representing measurements of the operating environment and provides that data to other systems and components within the system environment 200. The measurements may be of a component 232, the vehicle 100, the operating environment, etc. For example, a sensor 236 may measure a configuration or state of the component 232 (e.g., a setting, parameter, power load, etc.), measure conditions in the operating environment (e.g., moisture, temperature, etc.), capture information representing the operating environment (e.g., images, depth information, distance information), and generate data representing the measurement(s).

The control system 210 receives information from external systems 220 and the vehicle component array 230 and implements a treatment plan in an environment with a vehicle. The control system 210 may include one or more models and instructions to operate the vehicle in an environment with moisture. For example, in FIG. 2, the control system 210 includes a traversability model 240 and a moisture model 250. The traversability model 240 and moisture model 250 are further described below.

The network 240 connects nodes of the system environment 200 to allow microcontrollers and devices to communicate with each other. In some embodiments, the components are connected within the network as a Controller Area Network (CAN). In this case, within the network each element has an input and output connection, and the network 240 can translate information between the various elements. For example, the network 240 receives input information from the external system 220, processes the information, and transmits the information to the control system 210. The control system 210 generates an action based on the information and transmits instructions to implement the action to the appropriate component(s) 232 of the component array 230.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

V. Operating a Vehicle in an Environment with Moisture

As described above, a vehicle (e.g., vehicle 100) is configured to move through an environment and perform one or more actions (e.g., farming, construction, forestry, or mining actions) in the environment. Portions of the environment may include moisture, such as puddles or mud patches. A control system (e.g., control system 130) associated with the vehicle may include one or more models to help the vehicle operate (e.g., perform one or more actions) in the environment with moisture. In particular, the control system may employ a traversability model to reduce the likelihood of the vehicle becoming immobilized (e.g., getting stuck) in a portion of the environment, and may employ a moisture model to reduce the likelihood of the vehicle performing an action that will damage a portion of the environment. For example, in a construction context, a pit (e.g., at a rock quarry) may fill with water due to rain. The control system may use the traversability model to determine whether a heavy dump truck can drive through the pit without getting stuck and may use the moisture model to determine if the heavy dump truck will further enlarge the pit by an undesirable amount by driving through the pit. In another example, in another construction context, a mound of dirt may get wet due to rain. The control system may use the traversability model to determine whether a construction vehicle can drive up the mound without getting stuck, slipping back down the mound, or losing traction. Additionally, or alternatively, the control system may use the moisture model to determine if the mound will get damaged (e.g., deformed) due to a construction vehicle driving up the mound.

Figure 3:
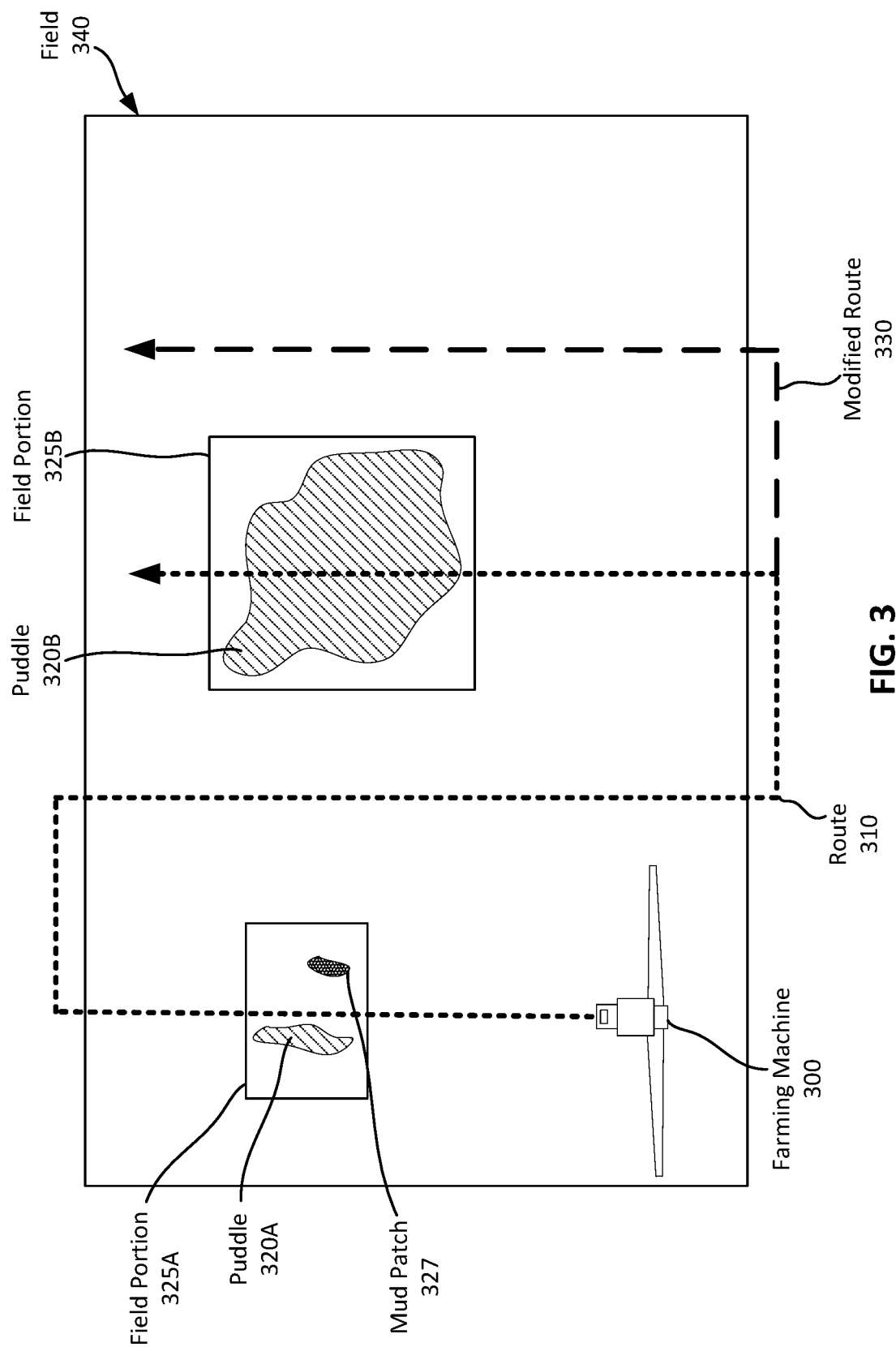
FIG. 3 is an overhead view of a farming machine moving along a route through a field with moisture, in accordance with an example embodiment.

FIG. 3 is an overhead view of a farming vehicle 300 (an example of a vehicle 100) moving along a route 310 through an agricultural field 340 with moisture (an example of an environment with moisture), according to an embodiment. Portions of the field (e.g., portions 325A and 325B) include moisture in the form of puddles of liquid 320 and a mud patch 327. In the example of FIG. 3, puddle 320B is significantly larger than puddle 320A. The farming vehicle 300 (e.g., via the control system 130) can analyze the moisture in the field 340 and determine whether the farming vehicle 300 will get stuck or damage the field 340 as it moves through portions 325 of the field 340 that include the puddles 320 and mud patch 327. In the example of FIG. 3, the control system determines that the vehicle can move through the portion 325A (including puddle 320A and mud patch 327). However, the farming vehicle 300 determines that it cannot or should not move through the portion 325B (including puddle 320B). For example, the farming vehicle 300 determines that the portion 325B has a traversability difficulty above the traversability capability of the farming vehicle 300. In another example, the farming vehicle 300 determines that the likelihood of the farming vehicle 300 damaging the portion 325B is above a likelihood threshold.

In response to the farming vehicle 300 determining that it cannot or should not move through the portion 325B (e.g., the vehicle determines the portion 325B is untraversable or there is a high likelihood that the vehicle will damage the portion 325B), the vehicle generates a modified route 330 for the farming vehicle 300. By traveling along the modified route 330, the farming vehicle 300 will avoid the portion of the field 340 that includes puddle 320B. If the farming vehicle 300 is performing actions in the field 340 (e.g., a farming action), the route may be modified so that portions of the field 340 around puddle 320B still receive actions by the vehicle (e.g., portions are still treated with a pesticide). For example, the farming vehicle 300 may drive around the puddle and back up to the puddle 320B to reduce the amount of unworked ground around the puddle 320B.

Although FIG. 3 and its above description are in a farming context, they are not limited to this context. The concepts described above with respect to FIG. 3 can be applied to other contexts where a vehicle is moving through an environment with moisture, such as a construction vehicle moving through a construction site with moisture or a forestry vehicle moving through a forest with moisture. For example, a grader construction vehicle applying grading construction actions on a construction site may operate in a similar manner as the farming machine 300.

V.A Applying the Traversability Model

Figure 4:
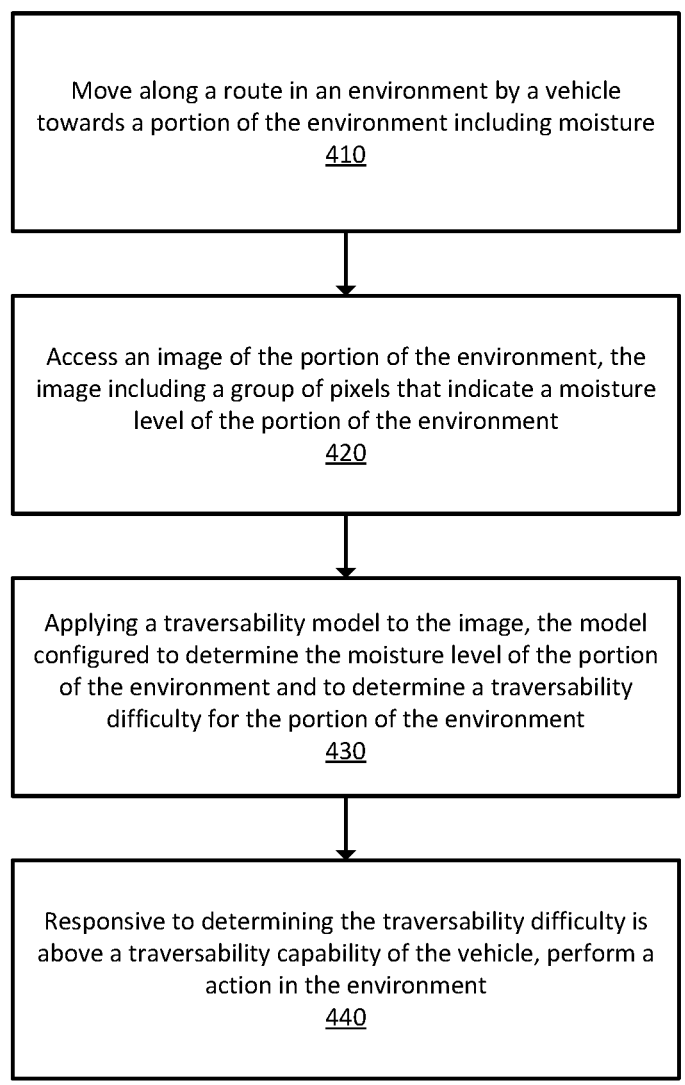
FIG. 4 illustrates a method for operating in an environment with moisture by a vehicle, in accordance with an example embodiment.

FIG. 4 illustrates a method for operating in an environment (e.g., field, road, street, construction site, mining site or forest) with moisture by a vehicle (e.g., vehicle 100), in accordance with an example embodiment. One or more steps of method 400 may be performed from the perspective of the control system 130. The method 400 can include greater or fewer steps than described herein. Additionally, the steps can be performed in different order, or by different components than described herein.

A vehicle (e.g., vehicle 100) moves 410 along a route in an environment (e.g., a farming, construction, mining, or forestry environment) towards a portion of the environment including moisture. An example of this is illustrated in FIG. 3. As described herein, a portion of the environment (also referred to as an environment portion) is a subsection of the environment that is smaller than the entire environment. An environment portion is large enough to include one or more bodies of moisture, which are large enough for the vehicle to potentially get stuck or large enough that the vehicle can potentially damage the environment if it moves through the environment portion. The vehicle may be actively controlled by an operator in the vehicle, remotely controlled by an operator, or autonomous. If the vehicle is autonomous, it may still receive instructions from an operator.

The control system accesses 420 an image of the portion of the environment. The image includes a group of pixels that indicate a moisture level of the portion of the environment. One or more image sensors capture the image. Example image sensors that can capture the image are described with reference to the detection mechanism 110. The image sensors may be coupled to the vehicle and oriented to capture the portion of the environment (e.g., a portion of the environment in front of the vehicle). The image sensors may capture images as the vehicle moves along the route. FIGS. 5A-5E are example images of environments with moisture that may be accessed by the control system. FIGS. 5A-5E are further described with reference to step 430.

Returning to FIG. 4, the control system applies 430 a traversability model to the image of the portion of the environment. The traversability model determines a moisture level of the portion of the environment and determines a traversability difficulty for the portion of the environment using the moisture level. Additionally, or alternatively, in some embodiments, the traversability model determines whether an environment portion is traversable or untraversable. Determining whether an environment portion is traversable or untraversable may be based on the moisture level. If a traversable portion of the environment is detected, the vehicle may move through the detected portion. If an untraversable portion of the environment is detected, an obstacle event may be triggered so that the vehicle performs an action, such as modifying the vehicle's route so that it does not move through the detected untraversable portion.

Moisture as described herein can include liquid (e.g., water) on the surface of the ground (e.g., a puddle, body, or pool of water), liquid in the ground (e.g., mud), and liquid in the air (e.g., rain or fog). The moisture level (also referred to as a measure of moisture) describes an amount of moisture in, on, or above the ground (e.g., soil) in the environment portion. The level may be an objective measure, such as an estimate in gallons of the amount of moisture or the shape and size of a body of moisture (e.g., the depth, width, and length a body of liquid). The level can alternatively be on a scale, such as one to ten, where one indicates no moisture and ten indicates the presence of a large amount of moisture. If the portion of the environment includes multiple bodies of moisture, the traversability model may determine multiple moisture levels e.g., a moisture level for each body of moisture. In some embodiments, the traversability model distinguishes between liquid on the surface, liquid in the ground, and liquid in the air and determines a moisture level for each. For example, the control system determines a moisture level for a pool of liquid on the surface and determines another level for mud around the pool of liquid. In some embodiments, the traversability model detects any possible obstructions due to moisture and quantifies how much of it is on a path of the vehicle or the percentage of the obstacle in the FOV (field of view) of the image sensor.

The control system determines the moisture level for the environment portion in the image, for example, by applying a moisture model. The control system determines the moisture level by analyzing one or more groups of pixels in the image to identify moisture and determine an amount of moisture in the image. For example, visual properties such as texture, reflection, and saturation indicate the presence, location, and amount of moisture. In some embodiments, the detection of polarized light may be used to detect the presence of liquid. In another example, pixel values from a thermal sensor are analyzed (e.g., since moisture can be identified by comparing local temperature values). In some embodiments, multiple images are used by the traversability model. For example, images captured by different types of image sensors or images captured at different views are analyzed together to determine the moisture level.

In addition to analyzing pixels of the image, the traversability model may receive non-visual information to determine the moisture level of the portion of the environment, such as temperature, humidity, wind, weather data, topography, or soil maps. For example, the control system accesses current or historical weather data for the portion of the environment to determine the moisture level.

As stated earlier, the traversability model uses the moisture level to determine a traversability difficulty for the portion of the environment. The traversability difficulty quantifies a level of difficulty for a vehicle to move through the portion of the environment having the moisture level. As described herein, a higher traversability difficulty indicates an environment portion is less traversable and a lower traversability difficulty indicates an environment portion is more traversable. Generally, a high moisture level results in a high traversability difficulty and vice versa, however the relationship may not be linear, and the traversability difficulty may depend on other factors, some of which are further described below. The relationship between moisture level and traversability difficulty may be machine learned, for example, by training the traversability model with historical traversability data. Historical traversability data may include images of environment portions, moisture levels of moisture in the images, and traversability difficulty scores associated with the environment portions. In some embodiments, the traversability model is trained for the specific environment that the vehicle is moving through (e.g., agricultural fields, constructions sites, or forestry environments). For example, a large puddle in a quarry may be traversable (e.g., since the ground includes gravel or concrete), while a similarly sized puddle in a farming field may not be traversable (e.g., since the ground includes mud). In these embodiments, the historical traversability data may include images of the specific environment (e.g., images of construction sites with moisture). The traversability difficulty is generally determined prior to the vehicle moving through the environment portion. However, a traversability difficulty may be determined or updated if/when the vehicle moves through the environment portion.

In some embodiments, the traversability difficulty indicates a likelihood of a vehicle losing traction or getting stuck. In another example, the traversability difficulty is on a scale, such as one to ten, where one indicates almost any vehicle can move through the environment portion and ten indicates only highly specialized vehicles can move through the environment portion. In other embodiments, the traversability difficulty specifies characteristics of vehicles that can move through the portion of the environment. For example, the traversability difficulty specifies a wheel type (e.g., wheel or track), a wheel size, a tread type, an engine/motor type, a drive type (e.g., front, rear, or all-while drive), a make, a model, a weight, a treatment mechanism, or coupling mechanism of a vehicle that can move through the portion of the environment.

While the traversability difficulty is based on the moisture level of the environment portion, the traversability difficulty may also be based on additional factors, such as ground (e.g., soil) type or gradient. For example, the traversability model includes a weighted model with a weight for each factor, where each weight indicates how strongly its corresponding factor affects the traversability difficulty. The additional factors may be determined by the traversability model. Example additional factors are described below.

An example additional factor is the one or more ground (e.g., soil) types in the portion of the environment. One or more ground types may be determined by analyzing pixels of an image of the environment portion (ground types may have identifiable colors and textures), accessing a soil map, or receiving input from an operator of the vehicle. Example ground types include clay, loam, sand, silt, gravel, asphalt, and concrete. Since moisture (and the amount of moisture) may affect the traversability of ground types differently, determining a ground type of an environment portion can assist in determining the traversability difficulty. For example, moisture in sand generally has no effect on traversability, but moisture in clay or loam generally decreases traversability (i.e., increases the traversability difficulty). If multiple ground types are identified, the traversability of the combination of the ground types may be considered (e.g., the presence of gravel in clay may make it more traversable). A ground type may also include objects (e.g., debris) on the ground that may affect traversability. For example, large amounts of leaves and branches on an asphalt road may make the road more slippery.

Another example factor is the gradient of the environment portion of the environment (also referred to as the grade or slope). Generally, higher a gradient decreases the traversability for an environment portion. In some embodiments, a slope larger than 9 degrees renders the environment portion untraversable. The gradient may be determined by analyzing pixels of the image, accessing a topography map, or receiving input from an operator of the vehicle.

Other indicators of the traversability difficulty include:
(1) The visibility of an edge of a body of moisture (also referred to as the boundary or outline). If an edge of a body of moisture is visible and distinct, it may indicate that the ground around the body is firm and dry. Thus, an identifiable edge of a body may decrease the traversability difficulty.
(2) An amount of debris (e.g., plant matter or construction debris) in a body of moisture. The presence of debris may decrease the traversability difficulty because debris may reduce the likelihood of loss of traction. Additionally, the presence of debris sticking up through a body of liquid may indicate that the body is not deep.
(3) A depth of track marks. The depth of track marks may indicate how firm the ground (e.g., soil) is. Deep track marks may indicate an environment portion is less traversable, and shallow track marks may indicate an environment portion is more traversable. The size of dirt clods (e.g., made by the vehicle as it moves through the environment) may also indicate how firm the ground is. For example, larger dirt clods may indicate an environment portion includes more moisture and is less traversable and smaller dirt clods my indicate an environment portion includes less moisture and is more traversable.
(4) Movement of a body of liquid. Movement of liquid can make an environment portion more difficult to traverse. Thus, a stagnant or slow-moving body may have a lower traversability difficulty than a body with a current (e.g., a river or stream).

These factors may be determined by analyzing pixels in an image of the environment portion. In some embodiments, one or more of these factors are part of or contribute to the moisture level. In some embodiments, the traversability difficulty is also based on factors that are not related to moisture, such as the presence of obstacles in the environment portion (e.g., a boulder or trench). Descriptions of the moisture level, additional factors, and the traversability difficulty are further described below with reference to FIGS. 5A-5E.

Figure 5A:
FIGS. 5A-5E are example images of environments with moisture that may be accessed by a control system of the vehicle, in accordance with one or more example embodiments.

FIG. 5A is an image of an environment 505 that includes a mud patch 510 with water 515 in the lower right corner. In the example, of FIG. 5A, the environment 505 is a farming field with rows. The amount of moisture may be determined based on the area and depth of the mud patch 510. The area may be determined by comparing the size of the patch 510 to the size of the rows in the environment. Similarly, the depth of the mud patch may be determined by comparing the height of the rows relative to the surface of the water 515 and mud in the patch 510. The depth of the water 515 does not seem deep since water in the mud is generally below the tops of the rows. Since the edges of the mud patch 510 are not clearly identifiable, this may increase the traversability difficulty of the mud patch. Although the environment is a farming field, the considerations described above (e.g., how the amount of moisture is determined) are applicable in other contexts, such as construction, mining, and forestry.

Figure 5B:
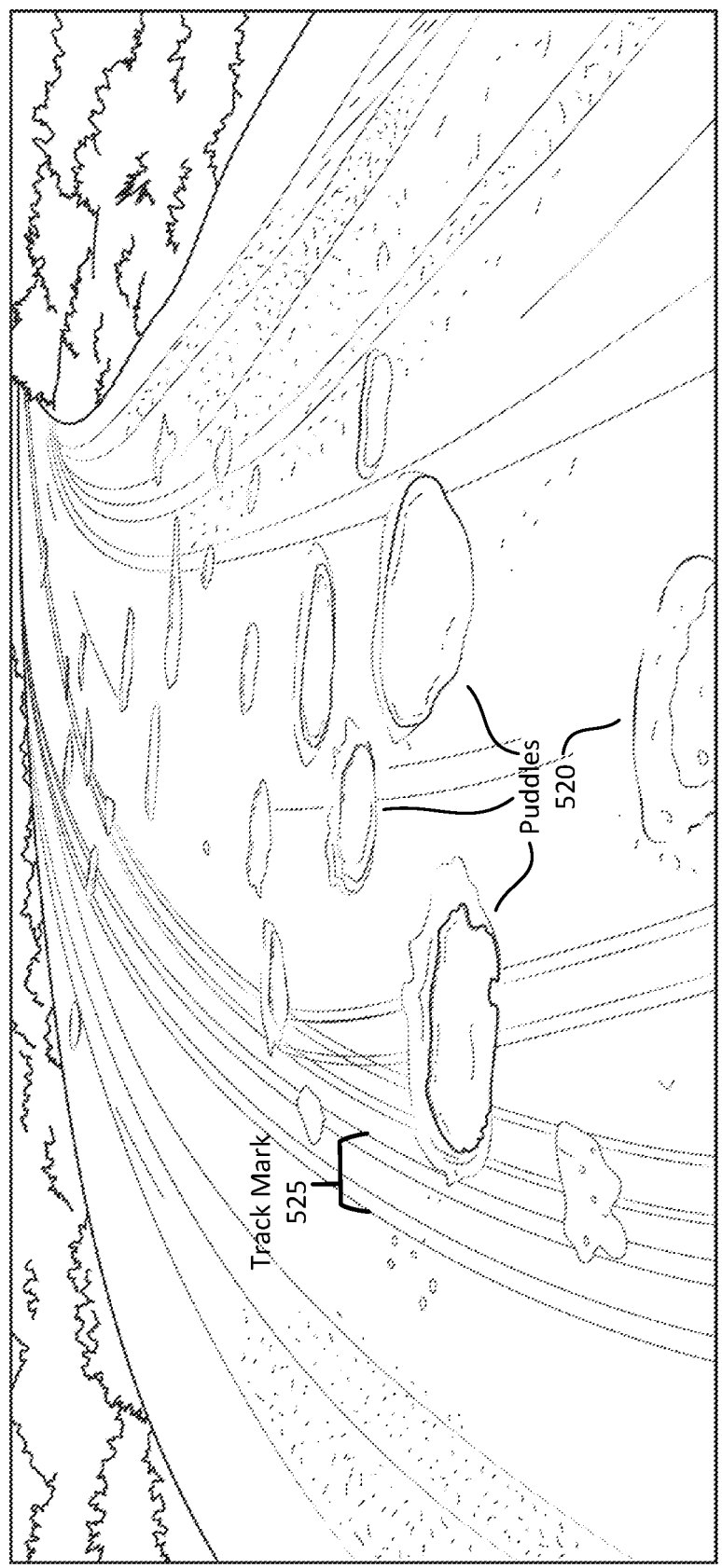

FIG. 5B is an image of a dirt road that includes circular puddles 520. The road may be part of many environment types, such as on a farming field, at a construction site, or in the forest. The edges of the puddles 520 are distinct, which may indicate that the ground around the puddles 520 is firm and dry. This is supported by the presence of faint track marks 525 in the dirt around the puddles 520. Additionally, the size of the puddles 520 is small (e.g., determined by comparing the puddles 520 to the width of the road). All of these features indicate that the moisture level and traversability difficulty are low for the road in FIG. 5B.

Figure 5C:
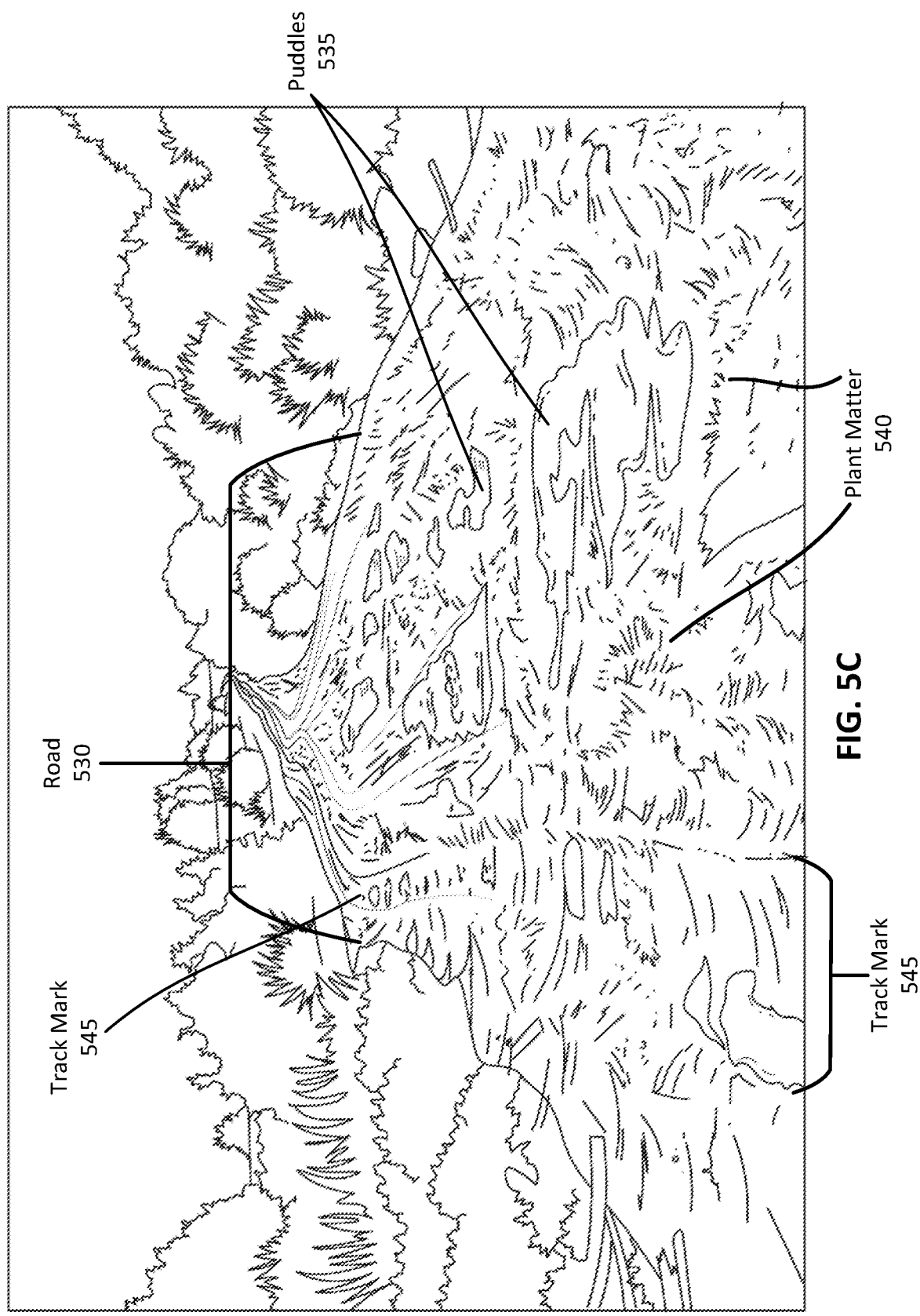

FIG. 5C is another image of a road 530 (e.g., at a farming field, at a construction site, or in the forest). The road 530 is muddy and includes puddles 535 with edges that are less defined than in FIG. 5B. This indicates that the road 530 is less traversable than the road in FIG. 5B. However, the mud and puddles include plant matter 540, which increases the traversability. FIG. 5C also includes track marks 545 that are deeper than the track marks 525 in FIG. 5B, which may decrease the traversability.

Figure 5D:
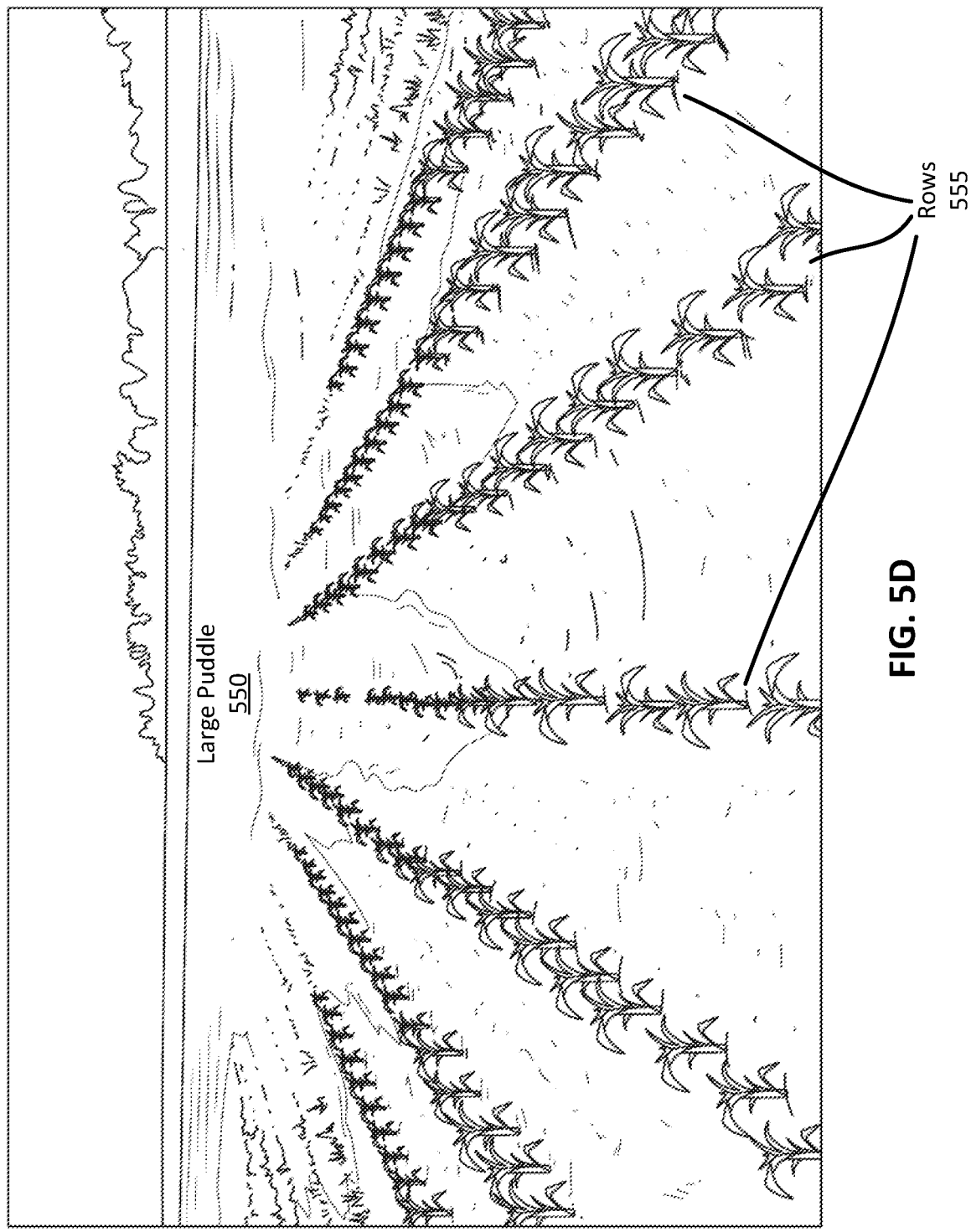
Figure 5E:
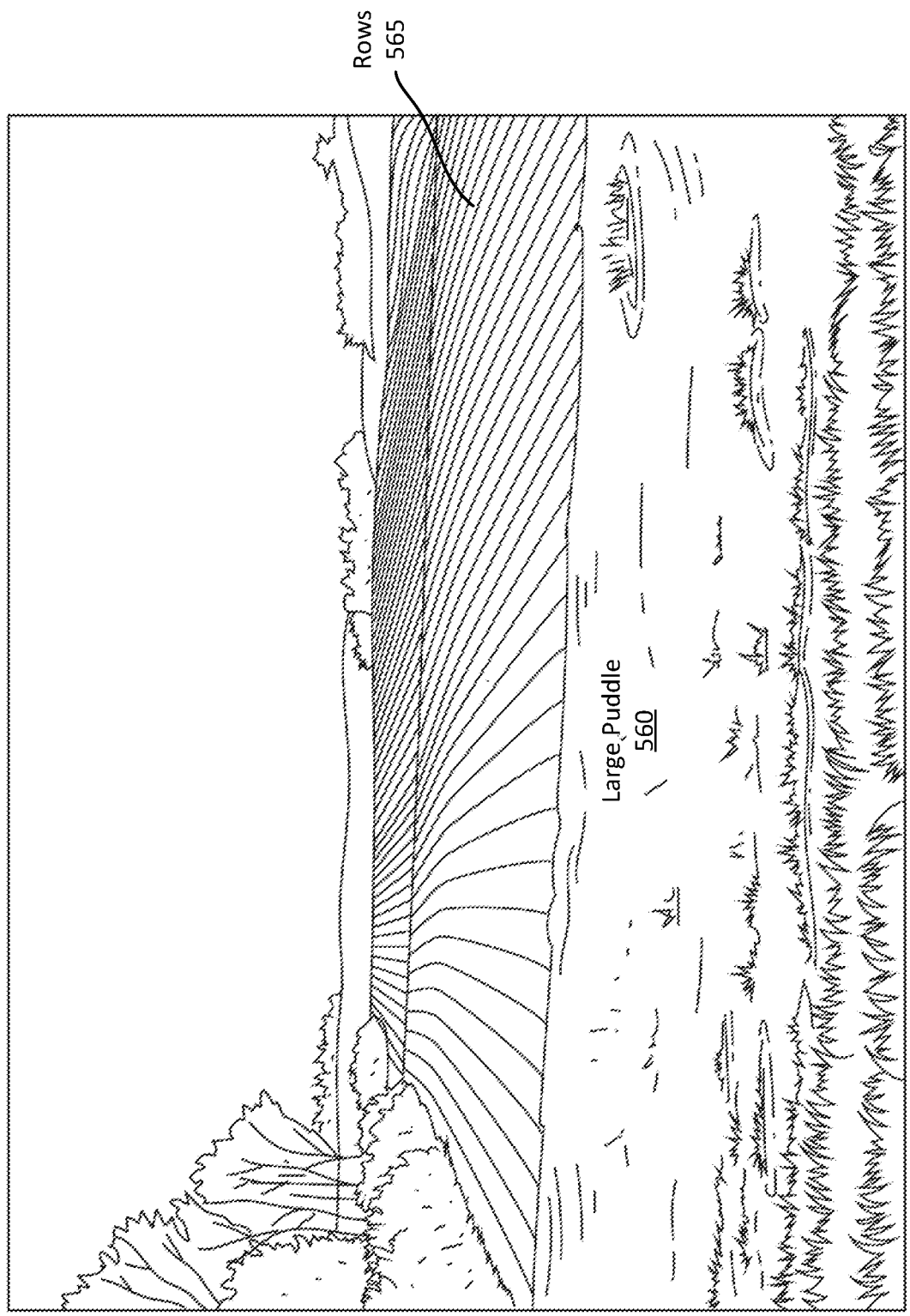

FIGS. 5D and 5E are images of farming fields with large puddles (550 and 560). Generally, small puddles between farm field rows are traversable. However, if standing water goes above the rows (e.g., rows 555 and 565), the environment may become non-traversable.

Referring back to FIG. 4, the vehicle performs 440 an action (e.g., after receiving instructions from the control system) in the environment responsive to determining the traversability difficulty is above a traversability capability of the vehicle.

The traversability capability quantifies an ability of the vehicle to travel through environments with moisture. As described herein, a higher traversability capability indicates the vehicle can traverse more difficult terrain. The traversability capability may have a same unit of measurement or be on a same scale as the traversability difficulty so that the values can be directly compared. The traversability capability of the vehicle may be based on operational parameters of the vehicle (e.g., speed and torque) and characteristics that may affect the vehicle's ability to traverse terrain. Example vehicle characteristics include a wheel type (e.g., wheel or tracks), a wheel size, a tread type, an engine/motor type, a drive type (e.g., front, rear, or all-while drive), a make, a model, a weight, a fuel level, a tank level for a sprayer, a treatment mechanism, or coupling mechanism of the vehicle. Values of these characteristics may be determined from sensors of the vehicle. One or more of the characteristics may be variable. For example, the weight of the vehicle changes over time as the vehicle consumes fuel or applies treatments to the environment (e.g., by emptying a cargo bed or tank). Thus, the traversability capability may be a fixed value or, in some embodiments, a variable quantity that changes over time based on the real time operational parameters and characteristics of the vehicle. In some embodiments, the traversability capability is specific to one or more actions performed by the vehicle as it moves through the environment. For example, a construction vehicle may have a first traversability capability if it is performing a first construction action (e.g., moving while excavating) and a second traversability capability if it is performing a second construction action (e.g., moving without excavating).

An action in the context of step 440 is an action performed by the vehicle (e.g., via the control system) and intended to prevent or reduce the likelihood of the vehicle traversing an untraversable environment portion. In some cases, the action modifies (e.g., cancels) an action already being performed by the vehicle. An example action includes modifying an operational parameter of the vehicle. Modifying an operational parameter may increase the traversability capability of the vehicle, such as increasing the speed, switching to all-wheel drive, switching from speed-control to torque-control on the drive wheel motors, ceasing to apply power to the wheels so that the vehicle 'coasts' through the environment portion, or raising a treatment mechanism, so that the traversability capability is no longer below the traversability difficulty. Another example of an action includes sending a warning notification to an operator of the vehicle. In another example, the action modifies (e.g., cancels) work performed by the vehicle (e.g., an action applied to the environment). For example, if a construction vehicle is performing a construction action (e.g., plowing soil) that limits the speed of the vehicle (e.g., so it will not have enough speed to traverse the environment portion), the action may cease the construction action (e.g., raise the plowing tool) so the vehicle can increase its speed. In another example, if a forestry vehicle is carrying a tree, the vehicle may drop the tree to increase its speed to increase the likelihood of traversing the environment portion.

In some embodiments, the action modifies the vehicle's route such that it does not move through (or ceases to move through) the portion of the environment including moisture (e.g., see description with respect to FIG. 4). If the route is modified, it may be modified so that the vehicle will move through the environment portion at a later point in time or so that the vehicle will move through the environment from a different direction (e.g., modifying the route so that the vehicle moves through the portion while traveling downhill instead of uphill). This may allow time for the conditions at the environment portion (e.g., the moisture level) to change. This may also provide the vehicle time or the opportunity to adjust one or more characteristics so it can move through the environment portion. For example, the route is modified so that the vehicle moves through the portion with a lighter machine load, such as waiting until the volume in a fuel tank or cargo bed has decreased. In another example, the vehicle modifies its weight or weight distribution by using counterweight brackets, shedding unused components, dumping material or transferring material to a storage tank, swapping components like wheels or tracks, disengaging a treatment mechanism (e.g., an excavator tool), or by attaching accessories like skids, skis, or additional idler wheels. In another example, the wheel or track width of the vehicle is modified. In some embodiments, the vehicle, another vehicle (e.g., a helper machine), or an operator may modify the environment portion (e.g., by applying sand, laying skids or boards onto the path, or blasting the area with air.)

The traversability difficulty may be determined while the vehicle is moving towards the portion of the environment. However, the traversability difficulty may be determined prior to this. For example, an image sensor (e.g., on a scout, drone, aerial imager, or satellite that is physically separate from the vehicle) captures an image of the environment portion of the environment and the traversability model is applied to the image (e.g., using cloud processing) prior to the vehicle moving through the environment. When it is time to move in the environment (e.g., later in the day or on another day), action instructions may be provided to the vehicle. Said differently, the traversability difficulty may be determined at a first time and the vehicle may perform the action based on the traversability difficulty (and the measure of traversability) at a second time, where the second time can occur at any time after the first time. In some embodiments, if the control system determines a traversability difficulty for one or more portions of the environment before the vehicle moves in the environment, the control system may determine the route based on the determined traversability difficulties (and the traversability capability of the vehicle).

As stated above, a traversability difficulty for a portion of the environment may be determined prior to the vehicle moving through the environment portion. However, the traversability difficulty may be determined or updated as the vehicle moves through the environment portion. Because the vehicle is closer to the portion of the environment, the updated traversability difficulty may be more accurate than the previously determined traversability difficulty. For example, a closer view of a body of moisture results in a more accurate determination of the size of the body, and thus, a more accurate traversability difficulty determination. If a traversability difficulty was previously determined for a portion of the environment, the vehicle may move through the portion of the environment if the traversability difficulty was not above the traversability capability of the vehicle. Below is an example description of updating the traversability difficulty for a vehicle that is traveling through the environment portion. The description is in the context of FIG. 4.

Responsive to the vehicle moving through the environment portion, the vehicle accesses a second image of the portion of the environment from a second image sensor. The image includes a second group of pixels that indicate an updated moisture level of the portion of the environment. The control system applies the traversability model to the second image. The traversability model determines the updated moisture level of the portion of the environment using the second group of pixels and determines an updated traversability difficulty for the portion of the environment using the updated moisture level. In some embodiments, the control system applies a model (e.g., to images captured by side sensors) to examine a previous environment portion (that the vehicle moved through) and a future environment portion (e.g., along a route) to determine if there is a difference in moisture or traversability difficulty. Responsive to a difference between the traversability difficulty and the updated traversability difficulty being greater than a threshold, the vehicle performs a second action.

The second image sensor may be the same image sensor that captured the first image. Alternatively, it may be a different image sensor. For example, the vehicle includes two image sensors. The first image sensor has a field of view that captures an environment portion that the vehicle is moving towards, where images from the first image sensor are used to determine a traversability difficulty for the environment portion. The second image sensor has a field of view that captures a current environment portion that the vehicle is moving through, where images from the second image sensor are used to determine a traversability difficulty for the current environment portion. In some embodiments, the second image sensor is positioned to include a view of the vehicle. For example, the second image sensor captures a view of a wheel of the vehicle in contact with the ground (e.g., to detect the presence of mud build up). In this example, an increase in wheel diameter may indicate the presence of mud build up on the tire and a decrease in wheel diameter may indicate the wheel is slipping. In some embodiments, the second image sensor is positioned to view the environment behind the vehicle (e.g., to capture the depth of track marks left by the vehicle).

The updated moisture level and updated traversability difficulty may be determined using one or more factors described with reference to step 430. However, now that the vehicle is traveling (or has traveled) through the portion of the environment, the vehicle may have access to new data that can additionally or alternatively be used to determine the updated moisture level and updated traversability difficulty. For example, the control system records diagnostic information from one or more diagnostic sensors of the vehicle, where the diagnostic information may indicate an updated moisture level or traversability difficulty. For example, a height sensor is mounted to the vehicle at a known height, and information from the height sensor indicates how deep the vehicle has sunk into the ground. In another example, a hygrometer mounted to the vehicle provides humidity information. In another example, information from a level sensor or altimeter may be used to determine the gradient of the environment portion. Other example sensors of the vehicle include motion sensors such as inertial measurement units (IMUs) (e.g., to measure cab vibrations of the vehicle), GPS sensors, torque/force sensors, thermal sensors, and draft/load sensors (e.g., on a pin of a chisel plow). Due to the presence of this new data, the traversability model may include a first model to determine the traversability difficulty and a second model to determine the updated traversability difficulty. In some embodiments, if an updated traversability difficulty (or updated moisture level) for an environment portion is significantly different than the traversability difficulty (or moisture level) for the environment portion, an updated traversability difficulty (or moisture level) may be determined for one or more other environment portions. This update may inform route changes for environment portions that now exceed a threshold but previously did not.

In addition to the diagnostic information, the control system may use real time operational parameters to determine an updated moisture level or traversability difficulty. For example, if the orientation of the vehicle is unresponsive or responds slower than expected to changes in the wheel steering direction, this may indicate an increase in the moisture level or traversability difficulty of the environment portion. In another example, if the engine/motor power usage is increasing (e.g., due to mud build up), this may indicate an increase in the moisture level or traversability difficulty.

Other examples of operational parameters include a gear setting, speed, engine/motor power, engine/motor torque, and engine/motor RPM (revolutions per minute). If the operational parameters are not inherently known, they may be determined using diagnostic information from one or more sensors in the vehicle. For example, the control system determines wheel or track slip of the vehicle. Slip may be determined by comparing diagnostic information from several sensors, such as rotary encoders in the wheels, GPS, and ground-facing radar. In another example, the control system monitors control errors. If tracking errors are higher than expected or if the tracking stability is worse than expected (e.g., increased overshoot or settling time), the control system may determine that an environment portion includes a higher moisture level or traversability difficulty. In some embodiments, actions performed to the environment by the vehicle may provide an indication of a moisture level or traversability difficulty. For example, if a farming vehicle performs a treatment action, such as spraying something on the soil, differences in how the spray looks on the soil may provide an indication of a moisture level. In another example, if a construction vehicle is a bulldozer clearing soil, movement of the soil may provide an indication of a moisture level.

Referring back to the updated traversability difficulty, the control system may compare the previously determined traversability difficulty with the newly determined updated traversability difficulty. If the difference between the traversability difficulty and the updated traversability difficulty is greater than a threshold, this may indicate that the previously determined traversability difficulty was inaccurate. To account for this, the vehicle may perform a second action. Similar to the actions described with reference to step 440, the second action may be performed to prevent (or reduce the likelihood of) the vehicle traversing an untraversable environment portion. The second action can include any of the actions described with reference to step 440.

V.B Applying the Moisture Model

Figure 6:
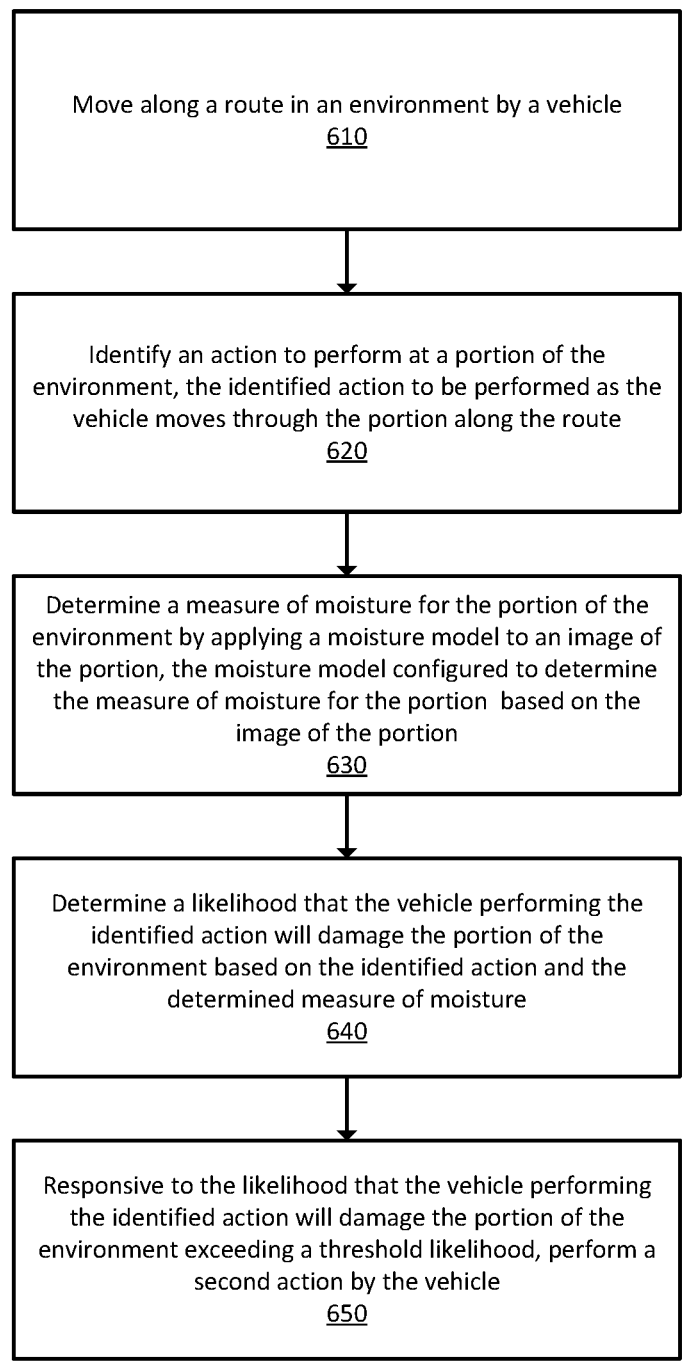
FIG. 6 illustrates another method for operating in an environment with moisture by a vehicle, in accordance with an example embodiment.

FIG. 6 illustrates another method for operating in an environment with moisture by a vehicle (e.g., vehicle 100), in accordance with one or more embodiments. One or more steps of method 600 may be performed from the perspective of the control system 130. The method 600 can include greater or fewer steps than described herein. Additionally, the steps can be performed in different order, or by different components than described herein.

Similar to step 410, a vehicle (e.g., vehicle 100) moves 610 along a route in an environment (e.g., a farming, construction, mining, or forestry environment) with moisture.

The control system identifies 620 an action to perform by the vehicle at a portion of the environment (as previously described, a portion is a subsection of the environment that is large enough to include one or more bodies of moisture, which are large enough for the vehicle to potentially get stuck or large enough that the vehicle can potentially damage the environment if it moves through the portion). The control system may identify the action in response to analyzing an image from an image sensor (e.g., sensor 210) or analyzing diagnostic information from sensors of the vehicle. The control system may also identify the action based on instructions from an operator. For example, an operator may instruct the vehicle (e.g., a construction vehicle) to use an excavator tool to backfill a hole. The control system typically identifies the action prior to the vehicle moving through the environment portion, but it may identify the action as the vehicle is moving through the environment portion.

In the context of step 620, an action is an action the vehicle may perform while in the portion of the environment (e.g., while moving through the environment portion). Examples of actions include performing a treatment action, modifying a treatment parameter, modifying an operational parameter, and modifying a sensor parameter. The identified action may be an action described with reference step 440.

The control system determines 630 a measure of moisture (also referred to as the moisture level) for a portion of the environment by applying a moisture model to an image of the portion of the environment.

As described with reference to step 420, the image of the portion of the environment includes a group of pixels that indicate a measure of moisture of the environment portion. One or more image sensors may capture the image. Example image sensors that can capture the image are described with reference to the detection mechanism 110. The image sensors may be coupled to the vehicle and oriented to capture the portion of the environment.

Similar to the traversability model, the moisture model determines a measure of moisture by analyzing one or more groups of pixels in the image. For example, visual properties such as texture, reflection, and saturation indicate the presence, location, and amount of moisture. In addition to analyzing pixels of the image, the traversability model may receive non-visual information to determine the moisture level of the portion of the environment, such as temperature, humidity, wind, weather data, topography, and soil maps. For more information on determining a measure or moisture, see the above description with reference to step 430. In some embodiments, the moisture model is part of the traversability model.

The control system determines 640 a likelihood that the vehicle performing the identified action will damage the portion of the environment based on the identified action and the determined measure of moisture for the portion of the environment.

The likelihood that the vehicle performing the identified action will damage the portion of the environment may refer to a specific type of damage or an amount of damage. An operator of the vehicle may specify the type and amount or these quantities may be predetermined. In one example, an operator specifies that they can tolerate an action slightly modifying an environment but do not want an action to form a new water run-off channel in the environment. Additional examples of damage include enlarging a preexisting water run-off channel above a threshold amount, enlarging a local depression above a threshold amount (this may increase the size of a body in the future), changing the gradient of the environment portion above a threshold amount, and compacting the ground (e.g., soil) above a threshold amount.

In a construction or forestry context, another example is an operator specifying that they can tolerate vehicles deforming a (e.g., muddy) road by a threshold amount but not more. In another example in a construction context, an operator specifies that a construction action should not result in the vehicle contacting a structure or other vehicle at the construction site. In another example, for a heavy construction vehicle with treads, an operator may specify that they can tolerate the treads damaging a first area of a construction site but not areas outside of the first area.

In a farming context, another example is an operator of a farming vehicle specifying that they can tolerate an action damaging (or killing) a few plants but do not want an action to damage (or kill) a threshold number of plants. Damage to a plant may be caused by the vehicle running it over, a component of the vehicle hitting it, or mud thrown by the vehicle hitting it. Determining whether an action will damage a plant may be based on the type of plant, a growth stage, a size, a location, or a planting configuration of the plant. Additional example types of damage to a portion of the environment include damaging a threshold number of rows in the environment and changing an irrigation pathway above a threshold amount. Another form of damage is unwanted biological consequences stemming from an action being performed in the presence of moisture. For example, planting into wet ground may be undesirable. Or applications of certain herbicides may be more/less effective if the crop is wet. In another example, environment modifications from ruts can reduce or impact the ability to harvest a crop later.

The control system may use a damage model to determine the likelihood. Generally, a higher level of moisture at the environment portion results in a higher likelihood that an action will damage the environment portion (and vice versa), however the relationship depends on the action, may not be linear, and may be based on other factors, some of which are further described below. For example, the damage model is a weighted model with a weight for each factor, where each weight indicates, for the determined measure of moisture, how strongly its corresponding factor affects the likelihood. In some embodiments, the relationship between the moisture level, the action, and the likelihood is machine learned, for example historical action data. Historical action data may include actions performed at environment portions, measures of moisture of the environment portions, and damage (if any) that the actions caused to the environment portions. In some embodiments, the damage model is trained for the specific environment that the action is performed in (e.g., agricultural fields, constructions sites, or forestry environments). Additionally, or alternatively, the damage model is trained for actions performed by specific types of vehicles. For example, the model may be trained differently for an action performed by a construction vehicle vs. a farming vehicle. Other factors that may affect the likelihood determination include:

(1) The route of the vehicle. The direction of travel through the environment portion may affect whether the action damages the environment portion. For example, a vehicle performing an action while moving uphill may be more likely to damage the environment portion than the vehicle performing the action while moving downhill. In another example, the direction of travel relative a body of moisture may determine whether the action damages the environment portion.

(2) Ground (e.g., soil) type of the environment portion. A ground type may affect how the ground responds to the action. For example, wet or damp cement will respond differently than cement that is already dry.

(3) The gradient of the environment portion. Generally, a higher gradient (e.g., regardless of the route) increases the likelihood the action will damage the environment portion while a smaller gradient decreases the likelihood. To determine the gradient, the control system may identify local minimums or maximums in the environment portion.

(4) Operational parameters. For example, a vehicle with a higher speed may increase the likelihood of the action damaging the environment portion. If the damage model determines the likelihood prior to the vehicle moving through the environment portion, the damage model may assume that the operational parameters will remain constant (or within a threshold range) while the vehicle moves through the environment portion.

(5) Characteristics of the vehicle. For example, a heavy vehicle may have a high likelihood of compacting the ground (e.g., soil) and enlarging depressions in the environment. Examples characteristics, such as wheel type, wheel size, etc., are described with reference to step 440.

In some cases, the likelihood is based on the vehicle actively performing the identified action in the environment portion. These cases may occur if an initial likelihood of damaging the environment is small or if the amount of potential damage is small. In these embodiments, the control system may determine whether the action being performed is damaging the environment. For example, the control system analyzes images of the vehicle performing the action.

If the likelihood does not exceed a threshold likelihood (e.g., provided by an operator or predetermined), the identified action may be performed, for example, when the vehicle enters the environment portion. However, if the likelihood exceeds the threshold likelihood, the control system performs 650 a second action, where the likelihood that the vehicle performing the second action will damage the portion of the environment is less than the threshold likelihood.

An action in the context of step 650 is an action performed by the vehicle and intended to prevent or reduce the likelihood of the vehicle damaging the portion of environment. The second action may be one or more of the actions described with reference to step 620, however the second action is either a different action or a same action that is performed with different parameters (e.g., the second action has a different tilling depth) than the identified action in step 620. Depending on the situation, the second action may be performed instead of the identified action, or the second action may modify the identified action (e.g., to reduce the likelihood that the identified action will damage the environment). In another example, the second action nullifies the identified action such that the identified action is not performed (or no longer performed) by the vehicle. For example, if the control system determines that moisture (e.g., a puddle) will spread a spray treatment applied to a plant (e.g., weed) to another plant (e.g., a crop), the second action may cancel the spray treatment action being performed by the vehicle. In another example, if the control system determines that an excavator action by a construction vehicle will form a new water run-off channel that is undesirable, the second action may cancel the excavator action.

As stated above, the control system may determine the measure of moisture and the likelihoods of the first and second actions while the vehicle is moving towards or through the portion of the environment. However, the control system may determine one or more of these values prior to this. For example, the control system applies the moisture model to the image of the environment portion (e.g., using cloud processing) prior to the vehicle moving through the environment. When it is time to move in the environment (e.g., later in the day or on another day), action instructions may be provided to the vehicle. Said differently, the measure of moisture and the likelihoods of the first and second actions may be determined at a first time and the vehicle may perform the second action at a second time, where the second time can occur at any time after the first time.

In some embodiments, as the vehicle gets closer to the environment portion or travels through the environment portion, it determines an updated likelihood of the identified action damaging the portion of the environment. If the updated likelihood is below the threshold likelihood, the vehicle may perform the identified action.

Methods 400 and 600 may be performed independently. In some embodiments, the methods are interconnected. For example, the action in step 440 may be the identified action in step 620.

V.C Implementation of Moisture Model

There are several methods to determine a measure of moisture in a captured image. One method of determining moisture information from a captured image is a moisture model that operates on a convex hull optimization model. Another method of determining moisture information from a captured image is a moisture model that operates on a fully convolutional encoder-decoder network. For example, the moisture model can be implemented as functions in a neural network trained to determine moisture information from visual information encoded as pixels in an image. The moisture model may function similarly to a pixelwise semantic segmentation model where the classes for labelling bodies of moisture indicate measures of moisture.

Figure 7:
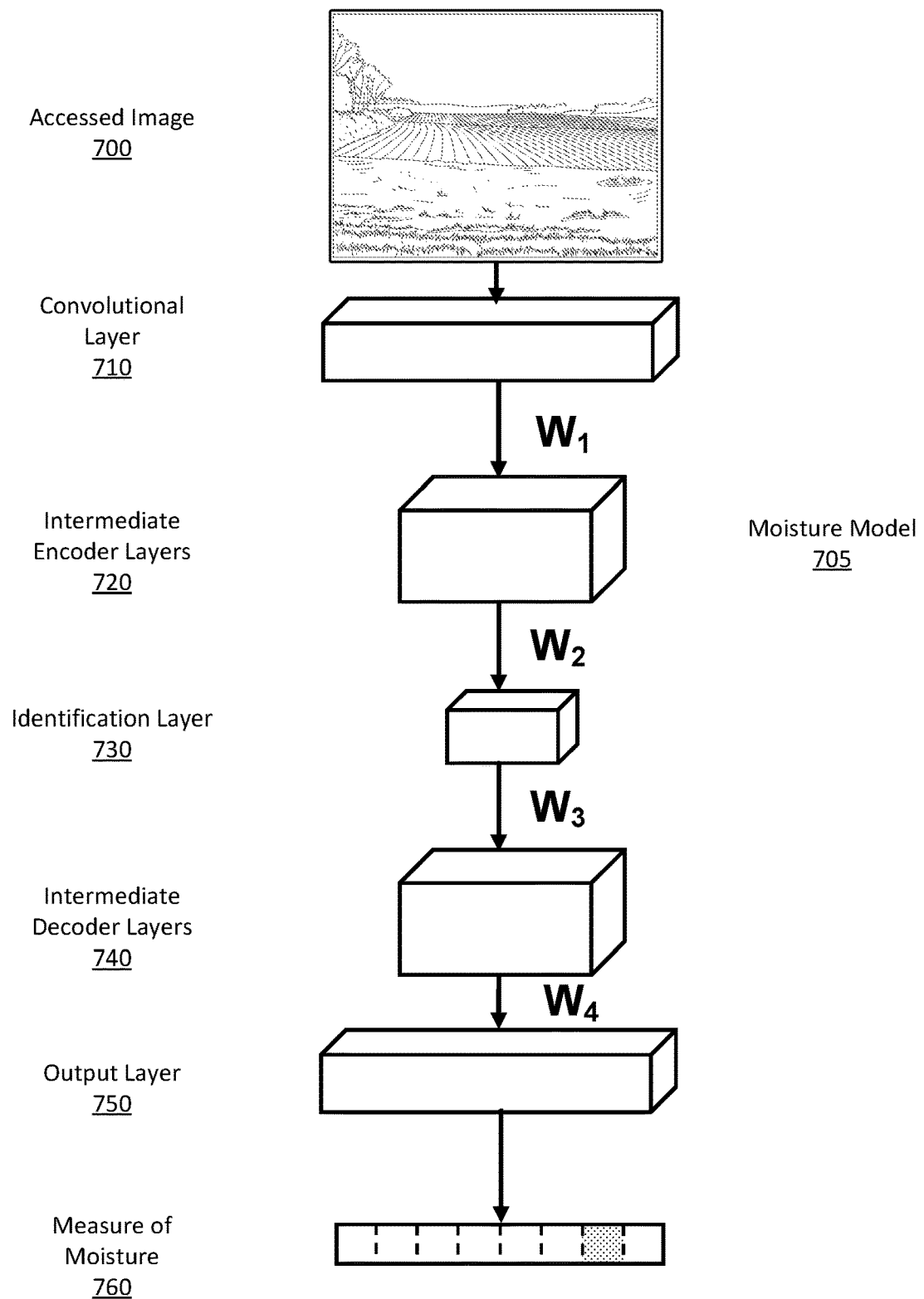
FIG. 7 illustrates a representation of a moisture model, in accordance with an example embodiment.

Herein, the encoder-decoder network may be implemented by a control system 130 as a moisture model 705. The control system 130 can execute the moisture model 705 to identify moisture associated with pixels in an accessed image 700 and quickly generate an accurate measure of moisture 760. To illustrate, FIG. 7 is a representation of a moisture model, in accordance with one example embodiment.

In the illustrated embodiment, the moisture model 705 is a convolutional neural network model with layers of nodes, in which values at nodes of a current layer are a transformation of values at nodes of a previous layer. A transformation in the model 705 is determined through a set of weights and parameters connecting the current layer and the previous layer. For example, as shown in FIG. 7, the example model 705 includes five layers of nodes: layers 710, 720, 730, 740, and 750. The control system 130 applies the function $W_1$ to transform from layer 710 to layer 720, applies the function $W_2$ to transform from layer 720 to layer 730, applies the function $W_3$ to transform from layer 730 to layer 740, and applies the function $W_4$ to transform from layer 740 to layer 750. In some examples, the transformation can also be determined through a set of weights and parameters used to transform between previous layers in the model. For example, the transformation $W_4$ from layer 740 to layer 750 can be based on parameters used to accomplish the transformation $W_1$ from layer 710 to 720.

In an example process, the control system 130 inputs an accessed image 700 (e.g., the image in FIG. 5E) to the model 705 and encodes the image onto the convolutional layer 710. After processing by the control system 130, the model 705 outputs a measure of moisture 760 decoded from the output layer 750. In the identification layer 730, the control system 130 employs the model 705 to identify moisture information associated with pixels in the accessed image 700. The moisture information may be indicative of amounts of moisture at a portion of the environment and their locations in the accessed image 700. The control system 130 reduces the dimensionality of the convolutional layer 710 to that of the identification layer 730 to identify moisture information in the accessed image pixels, and then increases the dimensionality of the identification layer 730 to generate a measure of moisture 760. In some examples, the moisture model 705 can group pixels in an accessed image 700 based on moisture information identified in the identification layer 730 when generating the measure of moisture 760.

As previously described, the control system 130 encodes an accessed image 700 to a convolutional layer 710. In one example, a captured image is directly encoded to the convolutional layer 710 because the dimensionality of the convolutional layer 710 is the same as a pixel dimensionality (e.g., number of pixels) of the accessed image 700. In other examples, the captured image can be adjusted such that the pixel dimensionality of the captured image is the same as the dimensionality of the convolutional layer 710. For example, the accessed image 700 may be cropped, reduced, scaled, etc.

The control system 130 applies the model 705 to relate an accessed image 700 in the convolutional layer 710 to moisture information in the identification layer 730. The control system 130 retrieves relevant information between these elements by applying a set of transformations (e.g., $W_1$, $W_2$, etc.) between the corresponding layers. Continuing with the example from FIG. 7, the convolutional layer 710 of the model 705 represents an accessed image 700, and identification layer 730 of the model 705 represents moisture information encoded in the image. The control system 130 identifies moisture information corresponding to pixels in an accessed image 700 by applying the transformations $W_1$ and $W_2$ to the pixel values of the accessed image 700 in the space of convolutional layer 710. The weights and parameters for the transformations may indicate relationships between the visual information contained in the accessed image and the inherent moisture information encoded in the accessed image 700. For example, the weights and parameters can be a quantization of shapes, distances, obscuration, etc. associated with moisture information in an accessed image 700. The control system 130 may learn the weights and parameters using historical user interaction data and labelled images.

In the identification layer 730, the control system maps pixels in the image to associated moisture information based on the latent information about the objects represented by the visual information in the captured image. The identified moisture information can be used to generate a measure of moisture 760. To generate a measure of moisture 760, the control system 130 employs the model 705 and applies the transformations $W_3$ and $W_4$ to the moisture information identified in identification layer 730. The transformations result in a set of nodes in the output layer 750. The weights and parameters for the transformations may indicate relationships between the image pixels in the accessed image 700 and a measure of moisture 760. In some cases, the control system 130 directly outputs a measure of moisture 760 from the nodes of the output layer 750, while in other cases the control system 130 decodes the nodes of the output layer 750 into a measure of moisture 760. That is, model 705 can include a conversion layer (not illustrated) that converts the output layer 750 to a measure of moisture 760.

The weights and parameters for the moisture model 705 can be collected and trained, for example, using data collected from previously captured visual images and a labeling process. The labeling process increases the accuracy and reduces the amount of time required by the control system 130 employing the model 705 to identify moisture information associated with pixels in an image.

Additionally, the model 705 can include layers known as intermediate layers. Intermediate layers are those that do not correspond to convolutional layer 110 for the accessed image 700, the identification layer 730 for the moisture information, and an output layer 750 for the measure of moisture 760. For example, as shown in FIG. 7, layers 720 are intermediate encoder layers between the convolutional layer 710 and the identification layer 730. Layer 740 is an intermediate decoder layer between the identification layer 730 and the output layer 750. Hidden layers are latent representations of different aspects of an accessed image that are not observed in the data but may govern the relationships between the elements of an image when identifying a measure of moisture associated with pixels in an image. For example, a node in the hidden layer may have strong connections (e.g., large weight values) to input values and values of nodes in an identification layer that share the commonality of moisture information. Specifically, in the example model of FIG. 7, nodes of the hidden layers 720 and 740 can link inherent visual information in the accessed image 700 that share common characteristics to help determine moisture information for one or more pixels.

Additionally, each intermediate layer may be a combination of functions such as, for example, residual blocks, convolutional layers, pooling operations, skip connections, concatenations, etc. Any number of intermediate encoder layers 720 can function to reduce the convolutional layer to the identification layer and any number of intermediate decoder layers 740 can function to increase the identification layer 730 to the output layer 750. Alternatively stated, the encoder intermediate layers reduce the pixel dimensionality to the moisture identification dimensionality, and the decoder intermediate layers increase the identification dimensionality to the measure of moisture dimensionality.

Furthermore, in various embodiments, the functions of the model 705 can reduce the accessed image 700 and identify any number of objects in an environment. The identified objects are represented in the identification layer 730 as a data structure having the identification dimensionality. In various other embodiments, the identification layer can identify latent information representing other objects in the accessed image. For example, the identification layer 730 can identify a result of a plant treatment, soil, an obstruction, or any other object in the environment.

Other models described herein, such as the traversability model and the damage model, may also be encoder-decoder networks similar to the moisture model 705 illustrated in FIG. 7. That is, an encoder-decoder network may be used to extract a traversability difficulty of an environment portion, or an expected damage of an action to the environment portion. In some cases, one encoder can be used for multiple decoders. For example, a single image can be encoded onto a convolutional neural network and the traversability, moisture, and damage expectations may be extracted from that image.

V.D Training a Moisture Model

The control system 130 or another entity may train the moisture model (e.g., moisture model 250). For example, the moisture model is trained using a plurality of labelled images of one or more environment portions. The labels in the images may indicate pixels with moisture information. The labels may be designated by an operator or labeled by someone offsite. In addition to labeling an image, non-visual information, such as temperature, humidity, wind, weather data (e.g., historical rainfall), topography, or a soil map, may be associated with the labeled images and used by the control system 130 to train the moisture model.

As described above, training the moisture model generates functions that are able to identify latent information in an image that corresponds to moisture information. The control system 130 may train the moisture model using the labelled images such that the moisture model tags a captured image with one or more measures of moisture. This approach allows the vehicle or control system 130 to determine a measure of moisture for an environment portion.

The control system 130 can train the moisture model periodically during operation of the vehicle, at a determined time, or before the moisture model is implemented on a vehicle. Additionally, the moisture model can be trained by another system such that the moisture model can be implemented on a control system of a vehicle as a standalone model. Notably, in some examples, the aspect of the control system 130 that trains the moisture model may not be collocated on the vehicle. That is, the moisture model may be trained on a machine separate from the vehicle 100 and transferred to the vehicle.

Other models described herein, such as the traversability model and the damage model, may also be trained similar to the moisture model. That is, a labeling process may be used to train the traversability model or the damage model. For example, the traversability model is trained using images that are labelled with moisture information and additional factor information, such as ground (e.g., soil) information, gradient information, or a depth of track marks in the images.

VI. Control System

Figure 8:
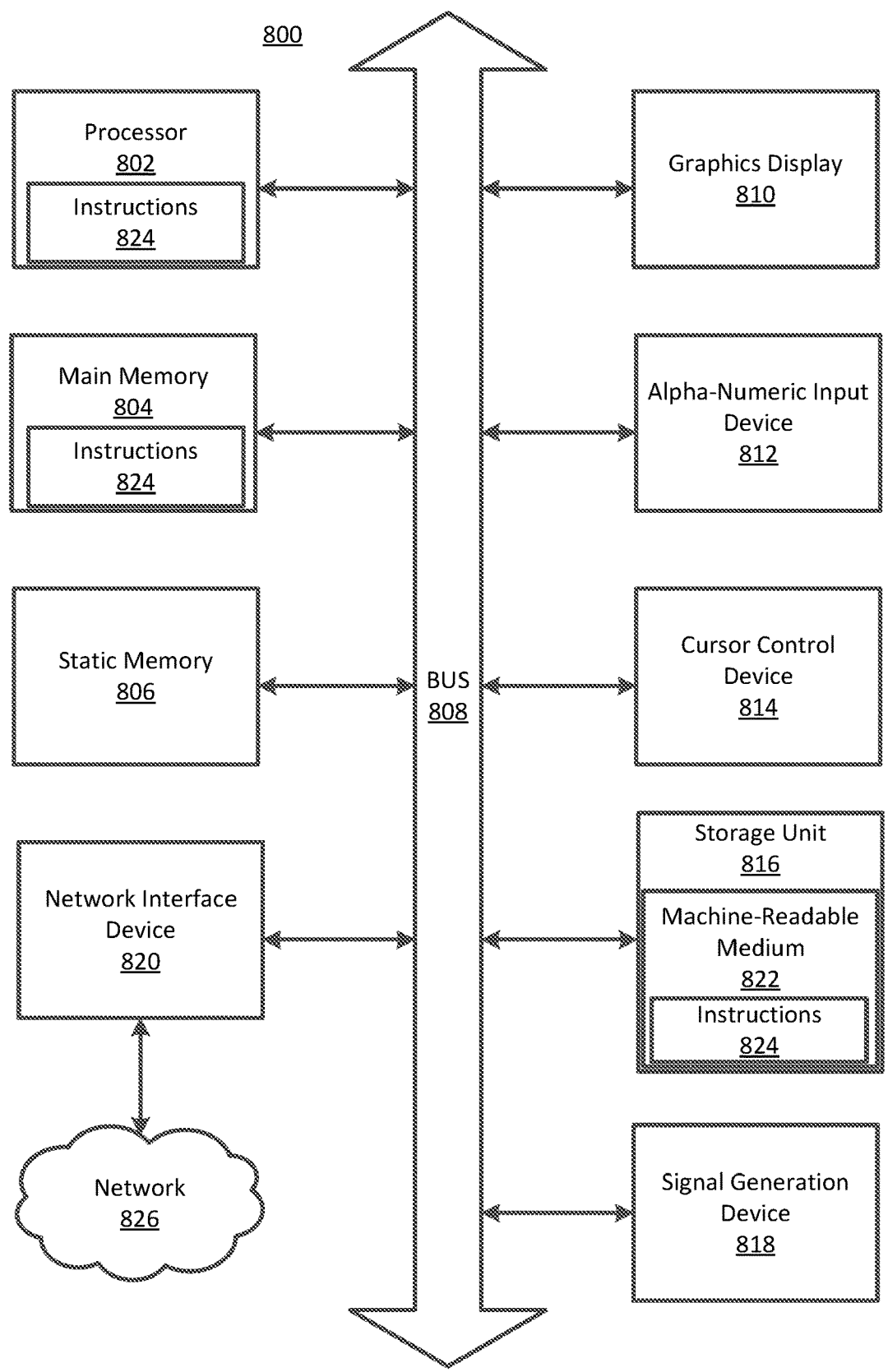
FIG. 8 illustrates a schematic of a control system, in accordance with an example embodiment.

FIG. 8 is a block diagram illustrating components of an example machine for reading and executing instructions from a machine-readable medium. Specifically, FIG. 8 shows a diagrammatic representation of control system 130 in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the system 130 described in FIG. 2. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820.

VII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for operating a vehicle in an environment with moisture including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for operating in a construction environment with moisture by a construction vehicle, the method comprising:
   moving, by the construction vehicle, along a route in the construction environment;
   identifying a construction action to perform by the construction vehicle at a portion of the construction environment, the identified construction action to be performed as the construction vehicle moves through the portion along the route;
   determining a measure of moisture for the portion of the construction environment by applying a moisture model to an image of the portion of the construction environment, the moisture model configured to determine the measure of moisture for the portion of the construction environment based on the image of the portion of the construction environment;

determining a likelihood that the construction vehicle performing the identified construction action will enlarge a water run-off channel or form a water run-off channel in the portion of the construction environment based on the identified construction action and the determined measure of moisture for the portion of the construction environment; and responsive to the likelihood that the construction vehicle performing the identified construction action will enlarge the water run-off channel or form the water run-off channel in the portion of the construction environment exceeding a threshold likelihood, performing a second construction action by the construction vehicle, wherein a likelihood that the construction vehicle performing the second construction action will enlarge the water run-off channel or form the water run-off channel in the portion of the construction environment is less than the threshold likelihood.

2. The method of claim 1, wherein the second construction action is performed instead of the identified construction action.

3. The method of claim 1, wherein the second construction action comprises nullifying the identified construction action such that the identified construction action is not performed as the construction vehicle moves along the route.

4. The method of claim 1, wherein the second construction action includes at least one of: modifying the route or modifying a driving parameter of the construction vehicle.

5. The method of claim 1, wherein determining the likelihood that the identified construction action will enlarge the water run-off channel or form the water run-off channel in the portion of the construction environment is further based on the route.

6. The method of claim 1, determining the likelihood that the identified construction action will enlarge the water run-off channel or form the water run-off channel in the portion of the construction environment is further based on diagnostic information from one or more sensors of the construction vehicle.

7. The method of claim 1, wherein determining the likelihood that the identified construction action will enlarge the water run-off channel or form the water run-off channel in the portion of the construction environment is further based on characteristics describing the construction vehicle, the characteristics including at least one of: a wheel type, a wheel size, a tread type, an engine/motor type, a drive type, a make, a model, a weight, a fuel level, a treatment mechanism, or a coupling mechanism of the construction vehicle.

8. The method of claim 1, wherein determining the likelihood that the identified construction action will enlarge the water run-off channel or form the water run-off channel in the portion of the construction environment is further based on one or more ground types in the portion of the construction environment and a gradient of the portion of the construction environment.

9. The method of claim 1, wherein the construction vehicle is autonomous.

10. The method of claim 1, wherein the moisture model is machine learned.

11. The method of claim 1, wherein determining the likelihood comprises applying the measure of moisture and the identified construction action to a model configured to determine the likelihood.

12. A construction vehicle configured to:

move along a route in a construction environment;

identify a construction action to perform at a portion of the construction environment, the identified construction action to be performed as the construction vehicle moves through the portion along the route;

determine a measure of moisture for the portion of the construction environment by applying a moisture model to an image of the portion of the construction environment captured by the construction vehicle, the moisture model configured to determine the measure of moisture for the portion of the construction environment based on the image of the portion of the construction environment;

determine a likelihood that the construction vehicle performing the identified construction action will enlarge a water run-off channel or form a water run-off channel in the portion of the construction environment based on the identified construction action and the determined measure of moisture for the portion of the construction environment; and responsive to the likelihood that the construction vehicle performing the identified construction action will enlarge the water run-off channel or form the water run-off channel in the portion of the construction environment exceeding a threshold likelihood, perform a second construction action, wherein a likelihood that the construction vehicle performing the second construction action will enlarge the water run-off channel or form the water run-off channel in the portion of the construction environment is less than the threshold likelihood.

13. The construction vehicle of claim 12, wherein the second construction action is performed instead of the identified construction action.

14. The construction vehicle of claim 12, wherein the second construction action comprises nullifying the identified construction action such that the identified construction action is not performed as the construction vehicle moves along the route.

15. The construction vehicle of claim 12, wherein the second construction action includes at least one of: modifying the route or modifying a driving parameter of the construction vehicle.

16. The construction vehicle of claim 12, wherein determining the likelihood that the identified construction action will enlarge the water run-off channel or form the water run-off channel in the portion of the construction environment is further based on the route.

17. The construction vehicle of claim 12, determining the likelihood that the identified construction action will enlarge the water run-off channel or form the water run-off channel in the portion of the construction environment is further based on diagnostic information from one or more sensors of the construction vehicle.

18. The construction vehicle of claim 12, wherein determining the likelihood that the identified construction action will enlarge the water run-off channel or form the water run-off channel in the portion of the construction environment is further based on characteristics describing the construction vehicle, the characteristics including at least one of: a wheel type, a wheel size, a tread type, an engine/motor type, a drive type, a make, a model, a weight, a fuel level, a treatment mechanism, or a coupling mechanism of the construction vehicle.

19. The construction vehicle of claim 12, wherein determining the likelihood that the identified construction action will enlarge the water run-off channel or form the water run-off channel in the portion of the construction environment is further based on one or more ground types in the portion of the construction environment and a gradient of the portion of the construction environment.

20. A non-transitory computer-readable storage medium storing instructions that, when executed by a computer, cause the computer to perform operations comprising:
    moving, by a construction vehicle, along a route in a construction environment with moisture;
    identifying a construction action to perform by the construction vehicle at a portion of the construction environment, the identified construction action to be performed as the construction vehicle moves through the portion along the route;
    determining a measure of moisture for the portion of the construction environment by applying a moisture model to an image of the portion of the construction environment, the moisture model configured to determine the measure of moisture for the portion of the construction environment based on the image of the portion of the construction environment;
    determining a likelihood that the construction vehicle performing the identified construction action will enlarge a water run-off channel or form a water run-off channel in the portion of the construction environment based on the identified construction action and the determined measure of moisture for the portion of the construction environment; and responsive to the likelihood that the construction vehicle performing the identified construction action will enlarge the water run-off channel or form the water run-off channel in the portion of the construction environment exceeding a threshold likelihood, performing a second construction action by the construction vehicle, wherein a likelihood that the construction vehicle performing the second construction action will enlarge the water run-off channel or form the water run-off channel in the portion of the construction environment is less than the threshold likelihood.

* * * * *